(12) United States Patent
Becattini, Jr. et al.

(10) Patent No.: US 10,888,069 B2
(45) Date of Patent: Jan. 12, 2021

(54) PET TOY INCLUDING APERTURES FOR RECEIVING TREATS

(71) Applicant: TOWERSTAR PETS, LLC, Malvern, PA (US)

(72) Inventors: Fernando Becattini, Jr., Malvern, PA (US); Fernando Becattini, Sr., Devon, PA (US); Jacquelyn N. Becattini, Malvern, PA (US); Steve A. Copeland, Barrie (CA); Mitchell Thompson, Barrie (CA)

(73) Assignee: Towerstar Pets, LLC, Malvern, PA (US)

( * ) Notice: Subject to any disclaimer, the term of this patent is extended or adjusted under 35 U.S.C. 154(b) by 164 days.

(21) Appl. No.: 16/175,994

(22) Filed: Oct. 31, 2018

(65) Prior Publication Data

US 2019/0133082 A1    May 9, 2019

Related U.S. Application Data

(63) Continuation-in-part of application No. 29/637,706, filed on Feb. 21, 2018, now Pat. No. Des. 843,680, (Continued)

(51) Int. Cl.
*A01K 15/02* (2006.01)
*A01K 5/01* (2006.01)

(52) U.S. Cl.
CPC .......... *A01K 15/026* (2013.01); *A01K 5/0114* (2013.01)

(58) Field of Classification Search
CPC ... A01K 15/026; A01K 15/025; A01K 5/0114
(Continued)

(56) References Cited

U.S. PATENT DOCUMENTS

D119,035 S    2/1940  Lindgren
D188,179 S *  6/1960  Tay .............................. D30/121
(Continued)

FOREIGN PATENT DOCUMENTS

DE    3850663     2/1995
DE    68926760    10/1996
(Continued)

*Primary Examiner* — Yvonne R Abbott-Lewis
(74) *Attorney, Agent, or Firm* — Sand, Sebolt & Wernow Co., LPA

(57) ABSTRACT

A pet treat toy in the shape of a dumbbell including a spherical or cylindrical body portion flanked by disc-shaped first and second enlarged members. The enlarged members are of a greater diameter than the body portion; consequently, the enlarged members keep the body portion a distance off the ground. Each enlarged member includes a concave surface with an outermost edge that contacts the ground if the toy is upended. An opening defined in one of the body portion and concave surface is in communication with the body portion's interior cavity. Treats loaded into the cavity through the opening are kept from contacting the ground because the opening is maintained a distance off the ground by the larger diameter enlarged members or because the opening is recessed relative to the outermost edge of the enlarged member's concave surface that defines the opening.

22 Claims, 30 Drawing Sheets

Related U.S. Application Data and a continuation-in-part of application No. 29/637,720, filed on Feb. 21, 2018, now Pat. No. Des. 849,338.

(60) Provisional application No. 62/582,611, filed on Nov. 7, 2017.

(58) Field of Classification Search
USPC ......... 119/707, 709, 710, 711; D30/160, 121
See application file for complete search history.

(56) References Cited

U.S. PATENT DOCUMENTS

| | | | |
|---|---|---|---|
| 3,037,500 A | * | 6/1962 | Daugherty ............. A61H 15/00 601/121 |
| 4,023,227 A | | 5/1977 | Chauvier |
| D253,373 S | | 11/1979 | Celeste |
| D256,503 S | | 8/1980 | Moustakas |
| D261,823 S | | 11/1981 | Gamm |
| 4,339,138 A | | 7/1982 | Di Manno |
| 4,455,074 A | | 6/1984 | Wong et al. |
| D274,649 S | | 7/1984 | Shiu |
| 4,460,264 A | | 7/1984 | Winter |
| 4,505,563 A | | 3/1985 | Wong et al. |
| D279,406 S | | 6/1985 | Shiu |
| 4,525,048 A | | 6/1985 | Wong et al. |
| 4,525,051 A | | 6/1985 | Wong et al. |
| D281,816 S | | 12/1985 | Conn, Sr. et al. |
| 4,575,580 A | | 3/1986 | Jandrell |
| 4,602,859 A | | 7/1986 | Chan |
| D286,215 S | | 10/1986 | Pataki |
| 4,656,400 A | | 4/1987 | Pailthorp et al. |
| D290,755 S | | 7/1987 | Hung |
| 4,695,936 A | | 9/1987 | Whittle |
| D299,648 S | | 1/1989 | Yoshiharu |
| 4,802,444 A | | 2/1989 | Markham et al. |
| D300,317 S | | 3/1989 | Yoshiharu |
| 4,813,907 A | | 3/1989 | Rissman et al. |
| D300,741 S | | 4/1989 | Yoshiharu |
| D301,231 S | | 5/1989 | Yoshiharu |
| D301,464 S | | 6/1989 | Yoshiharu |
| D302,155 S | | 7/1989 | Yoshiharu |
| D306,234 S | | 2/1990 | Ferstl |
| D307,339 S | | 4/1990 | Markham et al. |
| D308,122 S | | 5/1990 | Markham et al. |
| D315,029 S | | 2/1991 | Kwan |
| D316,318 S | | 4/1991 | Cheang |
| 5,015,939 A | | 5/1991 | Konecny |
| D317,805 S | | 6/1991 | Swan |
| D318,663 S | | 7/1991 | Frisinger |
| 5,097,403 A | | 3/1992 | Smith |
| D326,362 S | | 5/1992 | Bertwell |
| D326,562 S | | 6/1992 | Bertwell |
| D333,937 S | * | 3/1993 | Prosser ........................ D30/160 |
| RE34,352 E | | 8/1993 | Markham et al. |
| D342,977 S | | 1/1994 | Appel |
| D344,161 S | | 2/1994 | Markham |
| D344,949 S | | 3/1994 | So |
| D349,786 S | | 8/1994 | Markham |
| 5,393,231 A | | 2/1995 | Mak |
| D356,685 S | | 3/1995 | Bertwell |
| D357,952 S | | 5/1995 | Chen |
| 5,411,470 A | | 5/1995 | Liptak et al. |
| 5,426,354 A | | 6/1995 | Bausch |
| 5,427,456 A | | 6/1995 | Hensel |
| 5,433,529 A | | 7/1995 | Hensel |
| 5,485,807 A | | 1/1996 | Bertwell et al. |
| D373,859 S | | 9/1996 | Markham et al. |
| 5,640,931 A | | 6/1997 | Markham |
| D387,513 S | | 12/1997 | Mauldin, Jr. |
| D388,559 S | | 12/1997 | Mauldin, Jr. |
| 5,718,516 A | | 2/1998 | Cheever et al. |
| D392,576 S | | 3/1998 | Pun |
| D393,110 S | | 3/1998 | Mauldin, Jr. |
| 5,770,906 A | | 6/1998 | Hazelton et al. |
| 5,813,366 A | | 9/1998 | Mauldin, Jr. |
| 5,832,877 A | | 11/1998 | Markham |
| 5,847,479 A | | 12/1998 | Wang et al. |
| 5,865,146 A | * | 2/1999 | Markham ............. A01K 15/026 119/707 |
| 5,904,118 A | | 5/1999 | Markham |
| 5,947,061 A | | 9/1999 | Markham et al. |
| D420,056 S | | 2/2000 | Mauldin, Jr. |
| D427,389 S | | 6/2000 | Baiera et al. |
| 6,112,703 A | * | 9/2000 | Handelsman ........ A01K 15/026 119/707 |
| 6,129,053 A | | 10/2000 | Markham et al. |
| 6,354,050 B1 | | 3/2002 | Pankoski |
| 6,439,166 B1 | | 8/2002 | Markham |
| 6,546,896 B1 | | 4/2003 | Markham |
| D478,947 S | | 8/2003 | Lu |
| 6,625,088 B1 | | 9/2003 | Mah et al. |
| D481,482 S | | 10/2003 | Mah |
| D497,457 S | * | 10/2004 | Willinger ............. A01K 15/026 D24/211 |
| D502,698 S | | 3/2005 | Mah |
| D504,748 S | * | 5/2005 | Jager ............................ D24/211 |
| 7,112,178 B1 | | 9/2006 | Roozenburg |
| RE39,563 E | | 4/2007 | Markham |
| RE40,872 E | | 8/2009 | Markham |
| D648,034 S | | 1/2011 | Rice |
| 7,895,975 B2 | | 3/2011 | Markham |
| D636,949 S | * | 4/2011 | Axelrod ....................... D30/160 |
| D638,589 S | * | 5/2011 | Axelrod ....................... D30/160 |
| D650,536 S | | 12/2011 | Oblack et al. |
| D650,537 S | | 12/2011 | Oblack et al. |
| D658,539 S | | 5/2012 | Harshman |
| D658,817 S | | 5/2012 | Costello et al. |
| 8,167,745 B2 | | 5/2012 | Britto et al. |
| 8,225,747 B2 | | 7/2012 | Markham et al. |
| D665,136 S | * | 8/2012 | Day ............................ D30/160 |
| 8,276,547 B2 | | 10/2012 | Markham |
| 8,342,132 B2 | | 1/2013 | Markham |
| 8,342,133 B2 | | 1/2013 | Markham |
| D676,140 S | | 2/2013 | Feightner |
| 8,393,300 B2 | | 3/2013 | Markham et al. |
| 8,468,977 B2 | | 6/2013 | Markham |
| D687,159 S | | 7/2013 | Cho |
| 8,474,404 B2 | | 7/2013 | Costello |
| D688,836 S | | 8/2013 | Costello |
| D689,155 S | | 9/2013 | Jahns |
| D697,332 S | | 1/2014 | Huang |
| D700,755 S | | 3/2014 | Reiss et al. |
| D709,559 S | | 7/2014 | Baumann et al. |
| D709,562 S | | 7/2014 | Baumann et al. |
| D709,564 S | * | 7/2014 | Baumann .................... D21/398 |
| D718,461 S | | 11/2014 | Sato |
| 8,904,967 B2 | | 12/2014 | Reiss et al. |
| D722,730 S | | 2/2015 | Simon et al. |
| 8,978,590 B2 | | 3/2015 | Nunn et al. |
| D731,685 S | * | 6/2015 | Young ........................... D26/10 |
| D736,483 S | | 8/2015 | Crane |
| D746,002 S | | 12/2015 | Crane |
| 9,226,480 B2 | | 1/2016 | Axelrod et al. |
| D749,802 S | | 2/2016 | Crane |
| D751,724 S | * | 3/2016 | Nelson ......................... D24/211 |
| 9,282,724 B2 | | 3/2016 | Nunn |
| 9,301,496 B2 | | 4/2016 | Reiss et al. |
| 9,307,746 B2 | * | 4/2016 | Kellogg ................ A01K 15/026 |
| D760,451 S | * | 6/2016 | Harvey ......................... D30/160 |
| 9,497,934 B2 | | 11/2016 | Mak |
| D777,340 S | | 1/2017 | Nelson |
| 9,554,561 B2 | | 1/2017 | Axelrod et al. |
| 9,635,837 B2 | | 5/2017 | Simon |
| D800,330 S | | 10/2017 | Loos |
| 9,788,526 B2 | * | 10/2017 | Mann ................... A01K 15/026 |
| D804,110 S | | 11/2017 | Hamill et al. |
| D808,033 S | * | 1/2018 | Clithero ....................... D24/211 |
| D808,088 S | | 1/2018 | Stone |
| D809,218 S | * | 1/2018 | Yijie ............................ D30/160 |
| D809,219 S | | 1/2018 | Wright et al. |
| D812,322 S | * | 3/2018 | Hirschberg ................. D30/160 |
| D812,820 S | * | 3/2018 | Bolter ......................... D30/121 |

(56) References Cited

U.S. PATENT DOCUMENTS

| | | | |
|---|---|---|---|
| 9,961,880 B2 | 5/2018 | Simon et al. | |
| D821,041 S * | 6/2018 | Buesseler | D30/160 |
| D840,045 S | 2/2019 | Merkel et al. | |
| D843,680 S * | 3/2019 | Becattini, Jr. | D1/118 |
| D849,338 S * | 5/2019 | Becattini, Jr. | D30/160 |
| D850,016 S * | 5/2019 | Bolter | D30/121 |
| D872,385 S * | 1/2020 | Soto | D30/160 |
| 10,531,641 B2 * | 1/2020 | Valle | A01K 15/025 |
| D884,296 S * | 5/2020 | Gick | D30/160 |
| 2004/0083983 A1 | 5/2004 | Markham | |
| 2004/0134446 A1 | 7/2004 | Keller | |
| 2004/0224053 A1 | 11/2004 | Markham et al. | |
| 2004/0224063 A1 | 11/2004 | Markham et al. | |
| 2005/0045115 A1 * | 3/2005 | Mann | A01K 15/026 119/711 |
| 2007/0062459 A1 | 3/2007 | Costello et al. | |
| 2008/0035518 A1 | 2/2008 | Markham | |
| 2008/0141948 A1 * | 6/2008 | Renforth | A01K 15/026 119/710 |
| 2012/0272922 A1 * | 11/2012 | Axelrod | A01K 15/026 119/709 |
| 2014/0224184 A1 * | 8/2014 | Dewey | A01K 15/026 119/709 |
| 2015/0201584 A1 | 7/2015 | Crane | |
| 2016/0165844 A1 | 6/2016 | Nunn | |
| 2016/0165845 A1 | 6/2016 | Stone | |
| 2016/0227740 A1 | 8/2016 | Nunn | |
| 2016/0242391 A1 | 8/2016 | Stone et al. | |
| 2016/0309682 A1 | 10/2016 | Stone | |
| 2016/0324123 A1 | 11/2016 | Stone et al. | |
| 2017/0079244 A1 | 3/2017 | Mullin | |
| 2017/0118957 A1 | 5/2017 | Nunn | |
| 2017/0172109 A1 | 6/2017 | Costello | |
| 2017/0290296 A1 | 10/2017 | Simon | |
| 2017/0303508 A1 | 10/2017 | Stone | |
| 2017/0303509 A1 | 10/2017 | Stone | |
| 2017/0303510 A1 | 10/2017 | Stone et al. | |
| 2018/0000047 A1 | 1/2018 | Stone | |
| 2018/0000048 A1 | 1/2018 | Stone et al. | |

FOREIGN PATENT DOCUMENTS

| | | |
|---|---|---|
| DE | 68927068 | 1/1997 |
| DE | 69602261 | 8/1999 |
| DE | 69702856 | 1/2001 |
| DE | 69804129 | 7/2002 |
| DE | 69904921 | 6/2003 |
| DE | 69812090 | 10/2003 |
| EP | 0367793 | 7/1994 |
| EP | 0828417 | 4/1999 |
| EP | 0910242 | 8/2000 |
| EP | 1032259 | 3/2002 |
| EP | 1061795 | 1/2003 |
| EP | 0987938 | 3/2003 |
| EP | 1763993 | 3/2007 |
| EP | 3269234 | 1/2018 |
| WO | 1989000379 | 1/1989 |
| WO | 1996037098 | 11/1996 |
| WO | 1997047186 | 12/1997 |
| WO | 1998056243 | 12/1998 |
| WO | 199205183 | 5/1999 |
| WO | 199405763 | 9/1999 |
| WO | 2004043559 | 5/2004 |
| WO | 2004100676 | 11/2004 |
| WO | 2005110071 | 11/2005 |
| WO | 2008079689 | 7/2008 |
| WO | 2009020731 | 2/2009 |
| WO | 2011046764 | 4/2011 |
| WO | 2012051229 | 4/2012 |
| WO | 2012078176 | 6/2012 |
| WO | 2012158742 | 11/2012 |
| WO | 2017074889 | 5/2017 |
| WO | 2017106402 | 6/2017 |
| WO | 2017184344 | 10/2017 |

\* cited by examiner

PET TOY INCLUDING APERTURES FOR RECEIVING TREATS

CROSS-REFERENCE TO RELATED APPLICATIONS

This application claims the benefit of U.S. Provisional Patent Application Ser. No. 62/582,611, filed Nov. 7, 2017, the entire disclosure of which is incorporated herein by reference.

This application is a Continuation-in-Part of U.S. patent application Ser. No. 29/637,706, filed Feb. 21, 2018, the entire disclosure of which is incorporated herein by reference.

This application is a Continuation-in-Part of U.S. patent application Ser. No. 29/637,720, filed Feb. 21, 2018, the entire disclosure of which is incorporated herein by reference.

TECHNICAL FIELD

The present disclosure relates generally to a pet treat toy. More particularly, the present disclosure relates to a pet treat toy having a body defining an internal cavity for receiving a pet treat therein, the body is configured to hold an opening to the internal cavity at an elevated position above a ground surface upon which the pet treat toy rests.

BACKGROUND INFORMATION

Pet owners often enjoy giving their pet, such as a dog or a cat, a treat. However, some treats are messy and can cause surfaces such as a floor, carpet, furniture, or dog bed in the pet owner's home to become dirty. For example, many pet owners like to give their dogs peanut butter, which is a treat in the form of a semi-solid treat substance. It is well known that peanut butter smeared into a carpeted surface by a dog is difficult to clean.

There are many pet toys currently on the market that are designed to receive pet treats therein. These types of toys are often considered as a reward-type pet toy. This refers to a toy having an access opening in an exterior surface and through which a treat, such as a hard treat or quantity of a semi-solid treat substance, can be inserted into an interior cavity of the toy. These toys are typically made of a resilient surface that a pet can bite on and manipulate to gain access to the treat in the interior cavity. In other words, the pet needs to work at removing the treat from the toy, thus earning its reward.

A problem is created when a pet owner desires to fill known treat toys with a treat such as peanut butter or any other treat that is in the form of a semi-solid treat substance. When the pet, such as a dog, tries to remove the treat from the toy and the toy rolls on a floor surface, the semi-solid treat has a tendency to flow out of the access opening and substantially immediately come into contact the floor surface and soil the same.

SUMMARY

Thus, a need continues to exist for an improved pet treat toy that can be stuffed with treats, including semi-solid treats, but which will have a lower likelihood of treats exiting the toy and directly contacting various surfaces such as floors, carpets, furniture, or dog beds, and soiling the same while the pet is trying to remove the treat from the toy.

In accordance with one aspect of the present disclosure, a pet treat toy in the shape of a dumbbell including a spherical or cylindrical body portion flanked by disc-shaped first and second enlarged members. The enlarged members may be of a greater diameter than the body portion; consequently, the enlarged members keep the body portion a distance off the ground. Each enlarged member includes a concave surface with an outermost edge that contacts the ground if the toy is upended. An opening defined in one of the body portion and concave surface is in communication with the body portion's interior cavity. Treats loaded into the cavity through the opening are kept from contacting the ground because the opening is maintained a distance off the ground by the larger diameter enlarged members or because the opening is recessed relative to the outermost edge of the enlarged member's concave surface that defines the opening.

As indicated above, the pet treat toy is at least partially hollow and can be configured to be filled with a treat which the toy then keeps a distance away from a surface in a home that is contacted by the toy as the toy rolls or is otherwise manipulated by the pet. The treat toy can have a slotted receptacle for treats to be deposited therein. The treat toy may have one or more openings extending radially through a body portion of the dumbbell-shaped body of the treat toy and these openings may be of any geometric shape. Furthermore, the body portion may include stiffened spikes or tendrils, similar to that of a brush, that are located around the body portion. A semi-solid treat like peanut butter may be spread on the exterior surface of the body portion.

In another aspect, another exemplary embodiment of the present disclosure may provide a pet treat toy comprising a body portion defining a cavity therein; at least one enlarged member extending outwardly from the body portion; and an opening defined in one of the body portion and the at least one enlarged member; wherein said opening is in fluid communication with the cavity; and wherein a region of the at least one enlarged member is adapted to retain the opening a distance away from a surface upon which the pet treat toy rests.

In another aspect, another exemplary embodiment of the present disclosure may provide a method of providing a treat to a pet comprising inserting a pet treat through an opening defined in a body or in an enlarged member of a pet treat toy and into a cavity defined by the body; recessing the opening a distance inwardly from an edge of the body or from an edge of the enlarged member; placing the edge of the body or the edge of the enlarged member in contact with a surface inside of a pet owner's home; and keeping the pet treat a distance off the surface that is substantially equal to the distance that the opening is recessed inwardly from the edge of the body or from the edge of the enlarged member.

The inserting of the pet treat comprises inserting a first pet treat into the opening, where the first pet treat is a solid pet treat having a central region and one or more arms extending outwardly from the central region. The method may further comprise inserting a second pet treat through the opening; where the second pet treat is substantially similar to the first pet treat; interlocking at least some of the one or more arms of the first pet treat with at least some of the one or more arms of the second pet treat; and delaying removal of one of the first pet treat and the second pet treat from the interior cavity.

The method may further comprise progressively increasing a challenge to a pet to remove one of the first pet treat and the second pet treat by introducing at least a third pet treat through the opening; wherein the at least the third pet treat is substantially similar to the first pet treat; and the challenge is increased by interlocking at least some of the one or more arms of the third pet treat with at least some of the one or more arms of one or both of the first pet treat and the second pet treat.

The inserting of the pet treat may include placing a quantity of a semi-solid pet treat substance into the opening; and the method further comprises keeping the quantity of semi-solid pet treat substance away from contacting the surface upon which the pet treat toy rests by maintaining a portion of the enlarged member between the opening and the surface upon which the pet treat toy rests.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
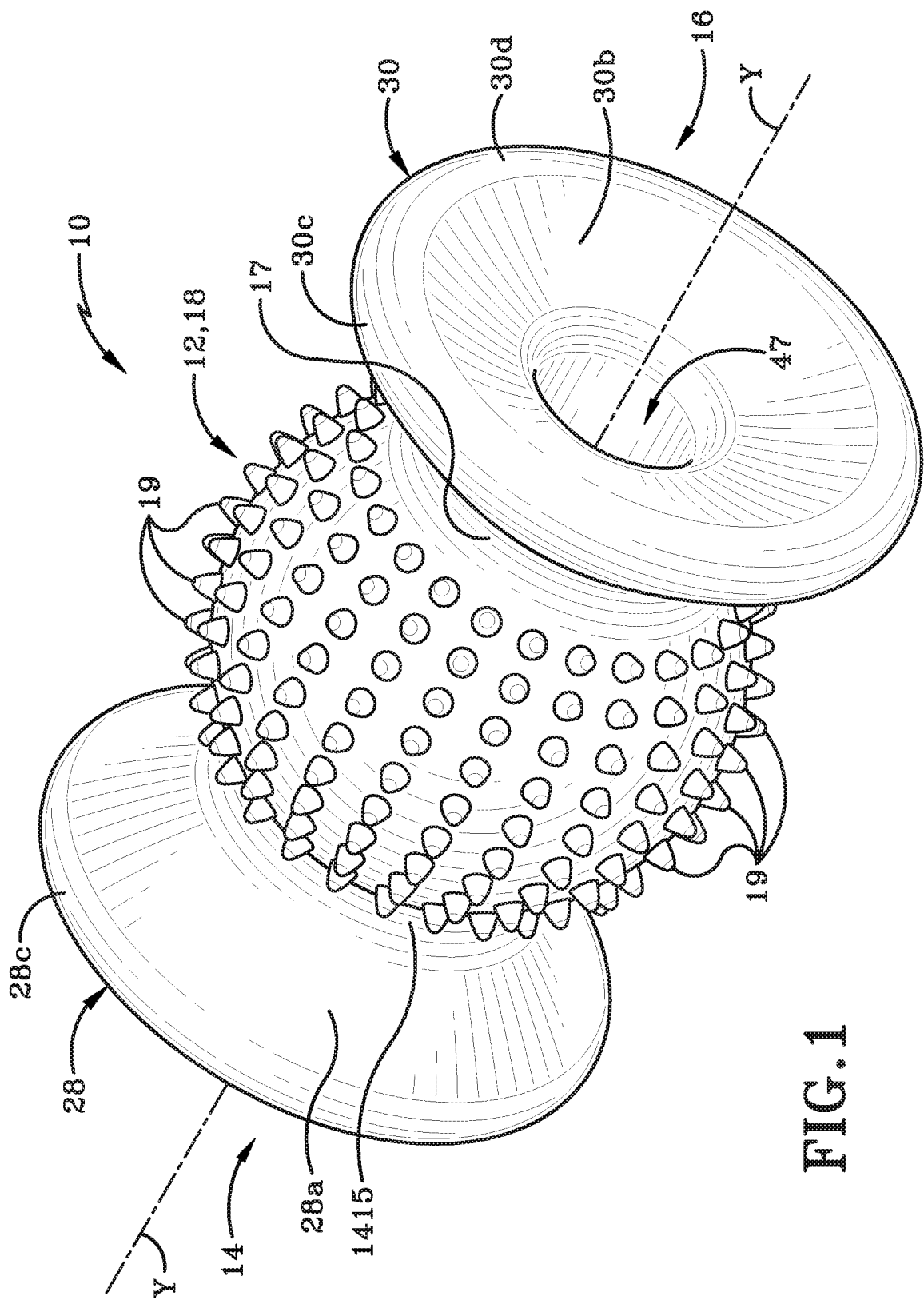
FIG. 1 is a perspective view of a first embodiment of a pet treat toy of the present disclosure.

Referring to FIGS. 1-7B, there is shown a first embodiment of a pet treat toy in accordance with an aspect of the present disclosure, generally indicated at 10. Treat toy 10 may include a body 12 that is generally dumbbell shaped. Treat toy 10 may include a first end 14, a second end 16, and a body portion 18 extending between first end 14 and second end 16.

Body 12 defines a longitudinal direction between first end 14 and second end 16 and a longitudinal axis "Y" extends centrally between first end 14 and second end 16. For descriptive purposes, some portions of body 12 of the treat toy 10 may be referred to as extending in radial directions relative to the longitudinal axis "Y". Body 12 may include a top region 20 and a bottom region 22 defining a vertical direction therebetween and a first side 24 and a second side 26 defining a transverse direction therebetween. Notably, the vertical direction and the transverse direction may be oriented orthogonal to each other and both may be considered radial relative to the longitudinal axis "Y".

Body 12 may be a unibody that is integrally formed as a unitary, monolithic member substantially fabricated from a flexible, manmade, synthetic material. In one example, synthetic polymers may form a substantial majority of the components or elements used to fabricate body 12 and the various components integrally molded therewith. While it is contemplated that body 12 and its additional components described herein are uniformly and integrally formed, it is entirely possible that the components of body 12 be formed separately from alternative materials as one having routine skill in the art would understand. In one example, body 12 may be formed from an elastomeric material or rubber material configured to withstand deformation upon impact or chewing or mastication by the pet. The flexible and elastomeric or rubber components of body 12 may enable certain portions of body 12 to flex or bend so as to permit ingress and egress of treats through various openings (which will be described hereafter) such that the treats inserted into an interior of the toy 10 may be accessed as a reward when the pet has sufficiently maneuvered the treat into a position to remove the same from the toy 10.

As depicted in FIGS. 1-4, a first enlarged member 28 may be provided on one side of body portion 18 and thereby form first end 14 of body 12. A second enlarged member 30 may be provided on an opposing side of body portion 18 and thereby form second end 16 of body 12. Body portion 18 extends between first and second enlarged members 28, 30, being separated therefrom by valleys 15 and 17, respectively. It should be understood that the term "enlarged" with respect to the members 28, 30 refers to a maximum exterior diameter of the members 28, 30 that is greater than a maximum exterior diameter of body portion 18 of toy 10, as will be discussed further herein. Valleys 15, 17 are regions of a narrower diameter than either of body portion 18 and first and second enlarged members 28, 30.

Figure 4:
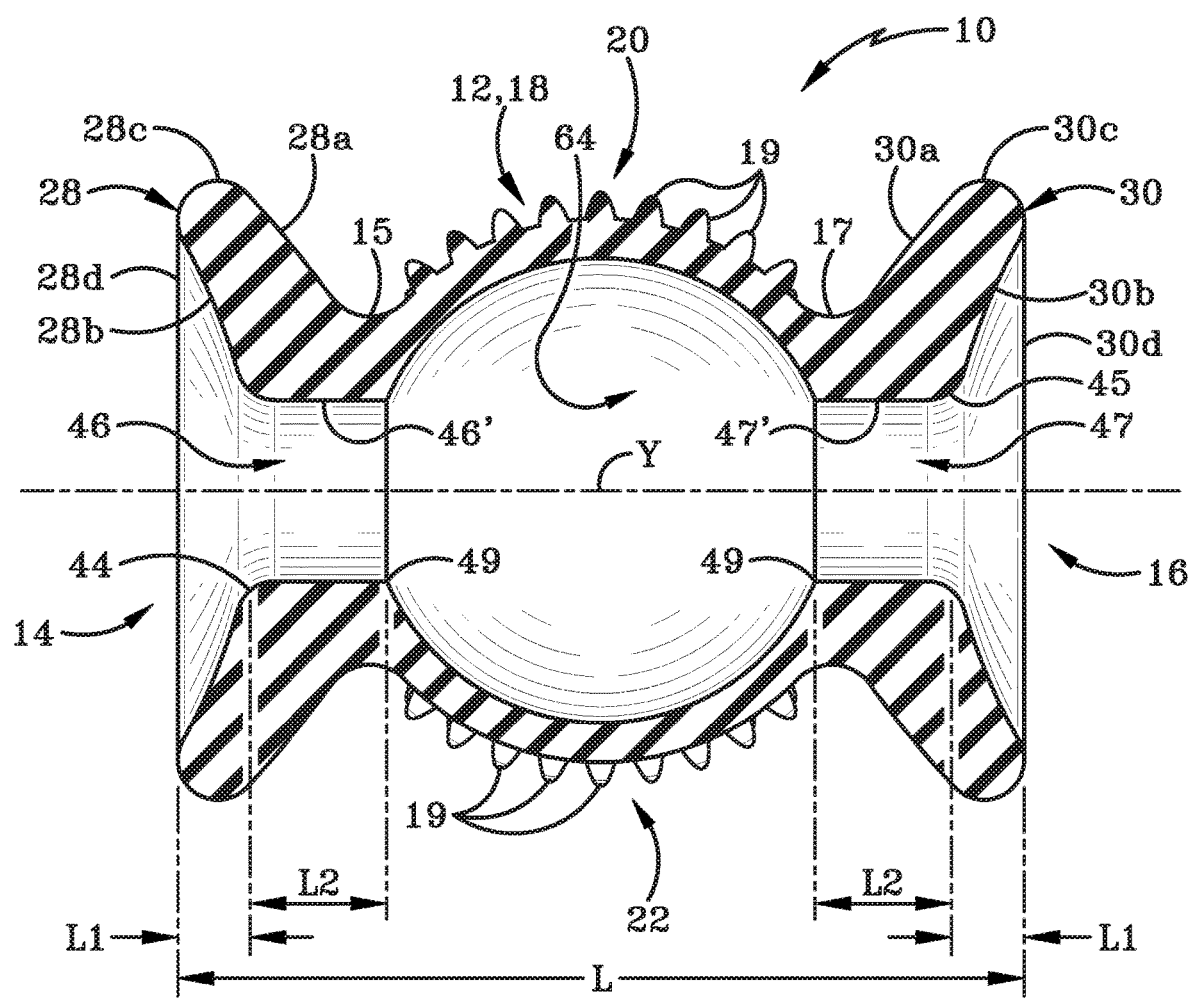
FIG. 4 is a longitudinal cross-section taken along line 4-4 of FIG. 3.

First and second enlarged members 28, 30 may be substantially identical in structure and function. First enlarged member 28 and second enlarged member 30 each intersect the longitudinal axis "Y" in a generally orthogonal manner. Each enlarged member 28, 30 is shaped generally like a disc. As shown in FIG. 4, first enlarged member 28 has a minor surface 28a and a major surface 28b associated therewith; and second enlarged member 30 has a minor surface 30a and a major surface 30b associated therewith. The minor surfaces 28a, 30a extend circumferentially around the longitudinal axis "Y". In one example, the minor surfaces 28a, 30a may be convexly curved and may be substantially continuous with a tapered portion of the toy 10 that narrows and is substantially continuous with body portion 18. The major surfaces 28b, 30b of first enlarged member 28 and second enlarged member 30 may be concavely curved. In particular, the concavely curved surface may be generally conical in shape. Still further, the concavely curved surface may be shaped as a truncated conical shape. Major surfaces 28b, 30b intersect the longitudinal axis "Y". Major surfaces 28b, 30b extend circumferentially around longitudinal axis "Y" in a smooth and continuous manner.

First and second enlarged members 28, 30 also have an outermost edge 28c, 30c and an end surface 28d, 30d. Outermost edges 28c, 30c extend between minor and major surfaces 28a, 30a, and 28b, 30b and are the regions of body 12 that will contact a surface "G" when toy 10 is in the orientation shown in FIG. 4. The surface "G" may be referred to herein as a "floor surface", "ground surface", "carpet surface", "pet bed surface" and should be understood to represent any surface in a pet's home or other location that may be contacted by toy 10 when the pet is attempting to retrieve a pet treat therefrom. End surfaces 28d, 30d of first and second enlarged members 28, 30 will be the regions of body 12 that will come into contact with surface "G" when toy is upended or tipped onto either of the first end 14 or second end 16.

Figure 2:
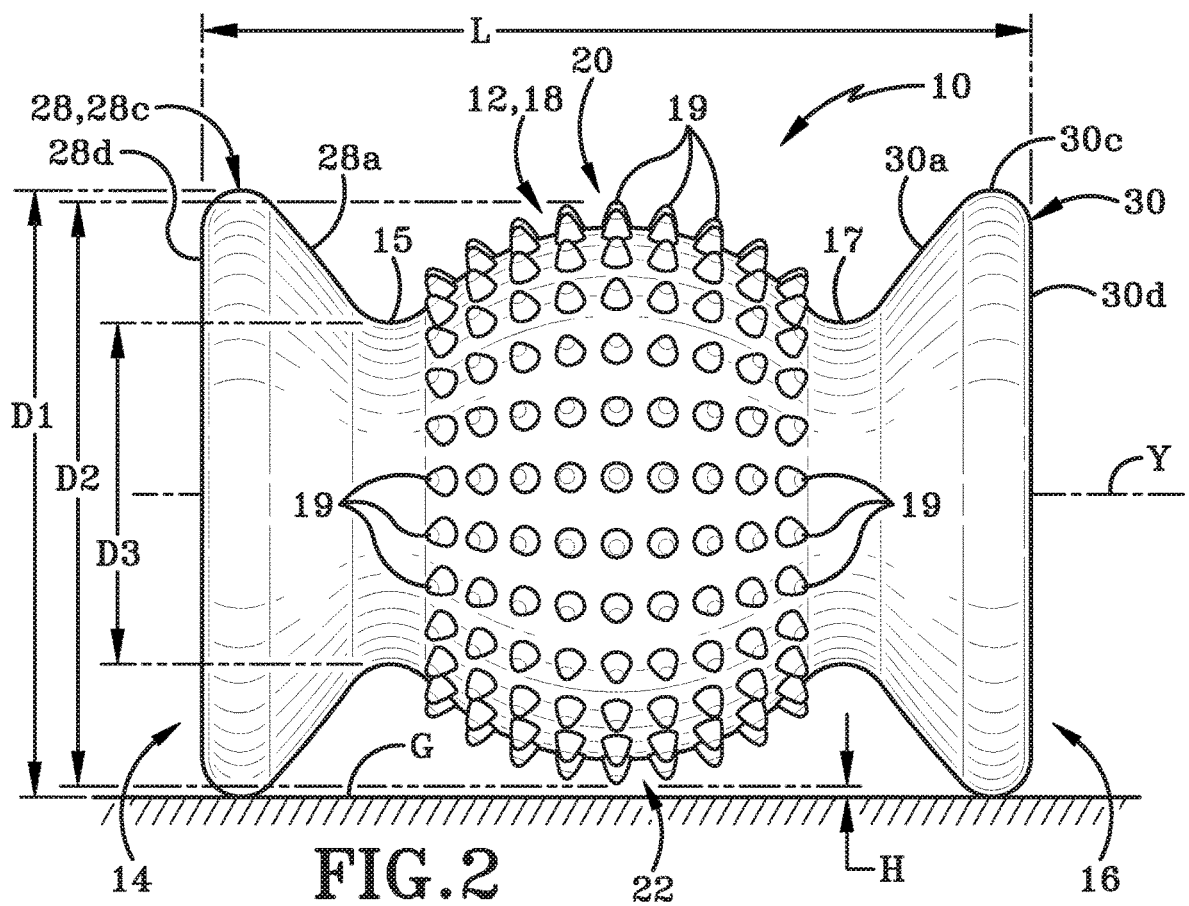
FIG. 2 is a front elevation view thereof; the unshown rear elevation view, front plan view, and back plan view all being substantially identical to the front elevation view.

As illustrated in FIG. 2, first and second enlarged members 28, 30 may have a maximum external diameter "D1", being the diameter of the circumferential edge 28c or 30c. The diameter of first enlarged member 28 and second enlarged member 30 may be substantially identical. Diameter "D1" is equal to a vertical height of the toy 10 when edges 28c, 30c rest on a surface "G". Body portion 18 may comprise a generally spherical wall that is of a diameter "D2". The diameter "D2" is smaller than the diameter "D1". Consequently, when the edges 28c, 30c of first and second enlarged members 28, 30 rest on surface "G", the exterior surface of the body portion's wall is retained a distance "H" (FIG. 2) away from surface "G". In one example, the height of toy 10 (i.e., diameter "D1") of first and second enlarged members 28, 30 may be in a range of from about two inches up to about four inches with the diameter "D2" of body portion 18 being marginally less than "D1".

Valley 15 is defined between body portion 18 and first enlarged member 28, and valley 17 is defined between body portion 18 and second enlarged member 30. Each valley 15, 17 extends around substantially the entire circumference of pet treat toy 10 and is of a reduced diameter "D3" (FIG. 4) relative to the diameter "D1" of first and second enlarged members 28, 30 and to the diameter "D2" of body portion 18. The different curvatures of spherical wall 18, valleys 15, 17, and first and second enlarged members 28, 30 make treat toy 10 more challenging for a pet to grab hold off and manipulate in order to remove any treats placed therein.

Treat toy 10 may include a plurality of nubbins 19 that extend radially outwardly from the wall that defines body portion 18. Nubbins 19 may be integrally formed as part of the wall and nubbins 19 may be arranged in circumferential, spaced-apart rows, as shown in FIG. 2. In other examples, nubbins 19 may be arranged in other patterns or may be randomly positioned. Nubbins 19 may be configured in any desired way. In one example, as illustrated in FIGS. 1-7B, each nubbin 19 may be generally conical in shape and taper in a direction moving away from the exterior surface of the body portion's wall. In other instances, a variety of differently configured nubbins 18 may be provided on the exterior of the wall. Valleys 15, 17 may be free of nubbins 19, as shown in the attached figures. In other examples, one or both valleys 15, 17 may include nubbins 19. The diameter "D2" of body portion 18 may be measured to the terminal tips of the nubbins 19.

Figure 3:
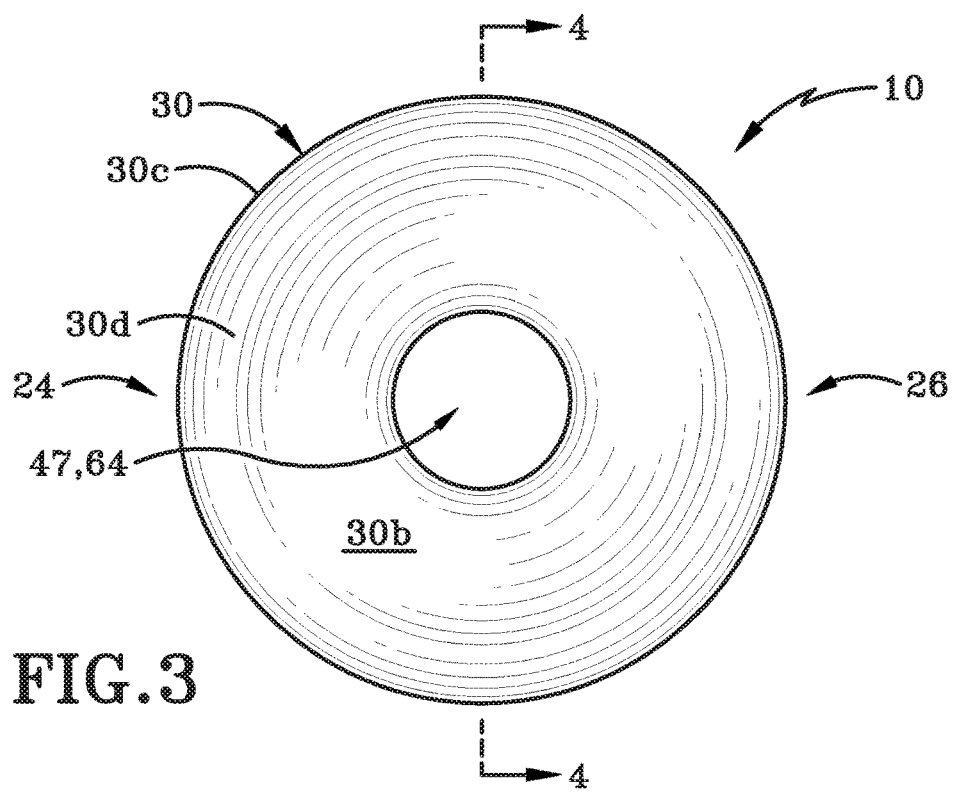
FIG. 3 is a right side elevation view thereof; the unshown left side elevation view being a mirror image thereof.

An innermost edge 44, 45 of each major surface 28b, 30b, respectively, bounds and defines an opening 46, 47 in the major surface. Openings 46, 47 may be generally centrally located in major surfaces 28b, 30b and may be generally circular in shape as is shown in FIG. 3. An interior surface of the wall of body portion 18 bounds and defines an interior cavity 64 that is generally spherical in shape and is in fluid communication with the openings 46, 47. An elongate passageway 46' may be formed between opening 46 and interior cavity 64 and an elongate passageway 47' may be formed between opening 47 and interior cavity 64. As best seen in FIG. 4, where the passageways 46', 47' enter interior cavity 64, a sharp edge 49 may be formed. The elongate passageways 46', 47' may be longitudinally aligned with each other and with longitudinal axis "Y" or they may be offset relative to each other or to longitudinal axis "Y".

Toy 10 may be of a length "L" (FIG. 4) measured from the first end 14 to the second end 16. Length "L" is the distance between end surface 28d and end surface 30d. In some exemplary toys 10, length "L" may be in a range of from about three inches up to about eight inches. FIG. 4 shows that each of the openings 46, 47 is recessed a distance "L1" from the associated end surface 28d, 30d. Each passageway 46', 47' may be of a length "L2".

It will be understood by those of ordinary skill in the art that the diameters "D1", "D2", and "D3" of the various parts of toy 10 may be smaller or larger than the diameters discussed above. It will further be understood by those of ordinary skill in the art that the lengths "L", "L1", and "L2" of the various parts of the toy 10 may be smaller or larger than the lengths discussed above.

Figure 6:
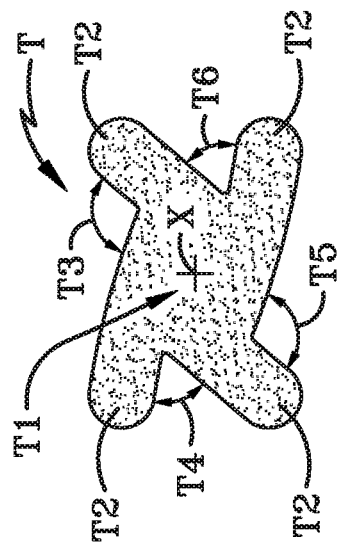
FIG. 6 is an end view of the solid treat of FIG. 5.
Figure 5:
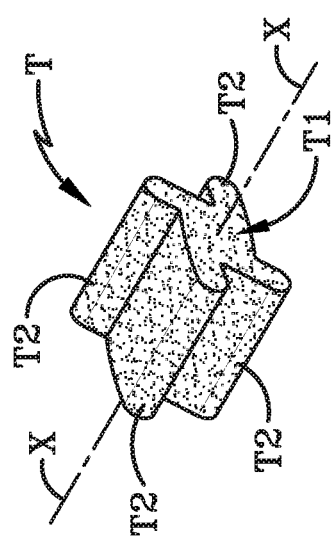
FIG. 5 is an isometric perspective view of a solid treat for insertion into the pet treat toy of FIG. 1.

FIGS. 5 and 6 illustrate an exemplary pet treat that may be inserted into interior cavity 64 of pet treat toy 10 through either of openings 46, 47. The exemplary pet treat is generally indicated by the reference letter "T". Pet treat "T" is a hard-bodied treat that may be formed in a crisscross shape. Pet treat "T" may be shaped and sized to just fit through openings 46, 47. Pet treat "T" may include a central region "T1" generally in the shape of a rectangular cube. Central region "T1" may extend along a longitudinal axis "X". A plurality of longitudinally elongate arms "T2" may extend outwardly from central region "T1" at various angles such as "T3", "T4", "T5", and "T6" relative to each other. The plurality of arms may include at least one arm that extends outwardly from central region "T1". In the treat "T" illustrated in FIGS. 5 and 6, four arms extend outwardly from central region "T1". In other words, a first arm, a second arm, a third arm and a fourth arm extend outwardly from central region "T1". The first arm may be oriented at a first angle "T3" relative to the second arm; and the first angle "T3" may be less than ninety degrees or more than ninety degrees. The second arm may be oriented at a second angle "T4" relative to the third arm; and the second angle "T4" may be less than ninety degrees or more than ninety degrees. The third arm may be oriented at a third angle "T5" relative to the fourth arm; and the third angle "T5" may be less than ninety degrees or more than ninety degrees. The fourth arm may be oriented at a fourth angle "T6" relative to the first arm; and the fourth angle "T6" may be less than ninety degrees or more than ninety degrees.

Figure 7A:
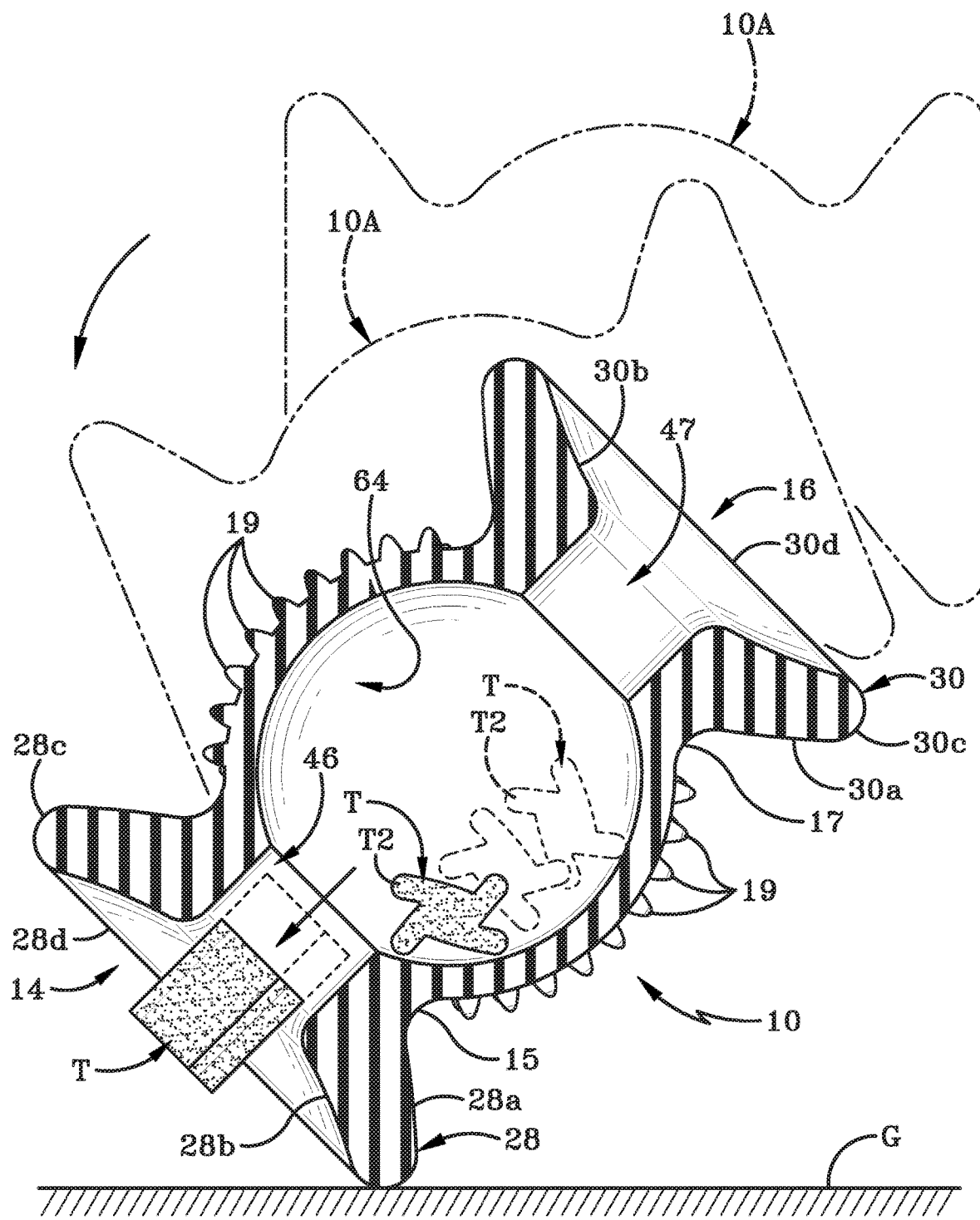
FIG. 7A is a longitudinal cross-section of the pet treat toy of FIG. 18 shown with a plurality of solid treats retained therein and showing one treat being removed through an access opening in one end of the pet treat toy as the same is moved around by a pet.
Figure 7B:
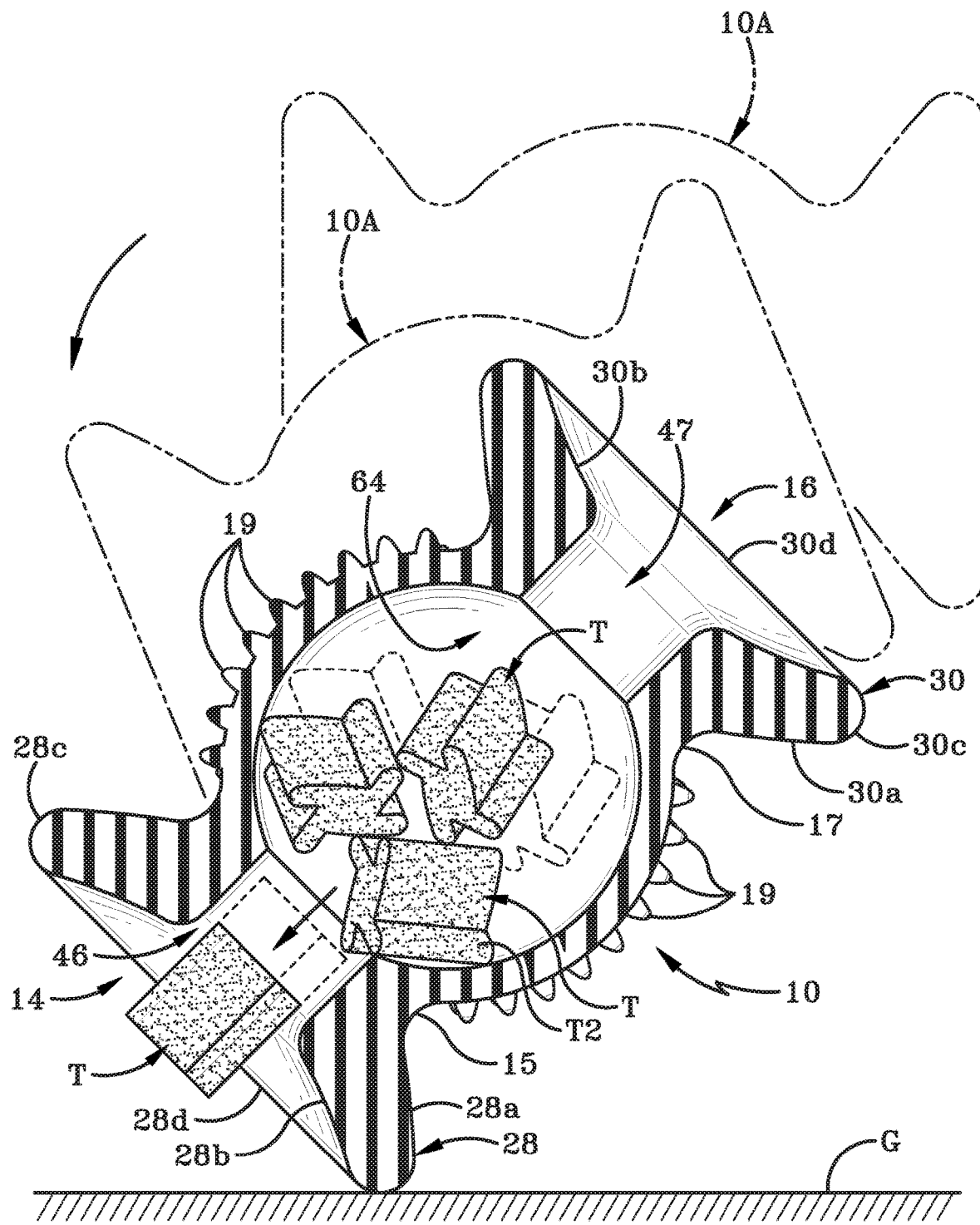
FIG. 7B is a longitudinal cross-section of the pet treat toy of FIG. 18 showing the multiple solid pet treats of FIGS. 21 and 22 retained in the interior of the pet treat toy and demonstrating an increase in difficulty of removing the pet treats from the access openings of the pet treat toy because of interlocking engagement of the arms of the multiple pet treats.
Figure 8:
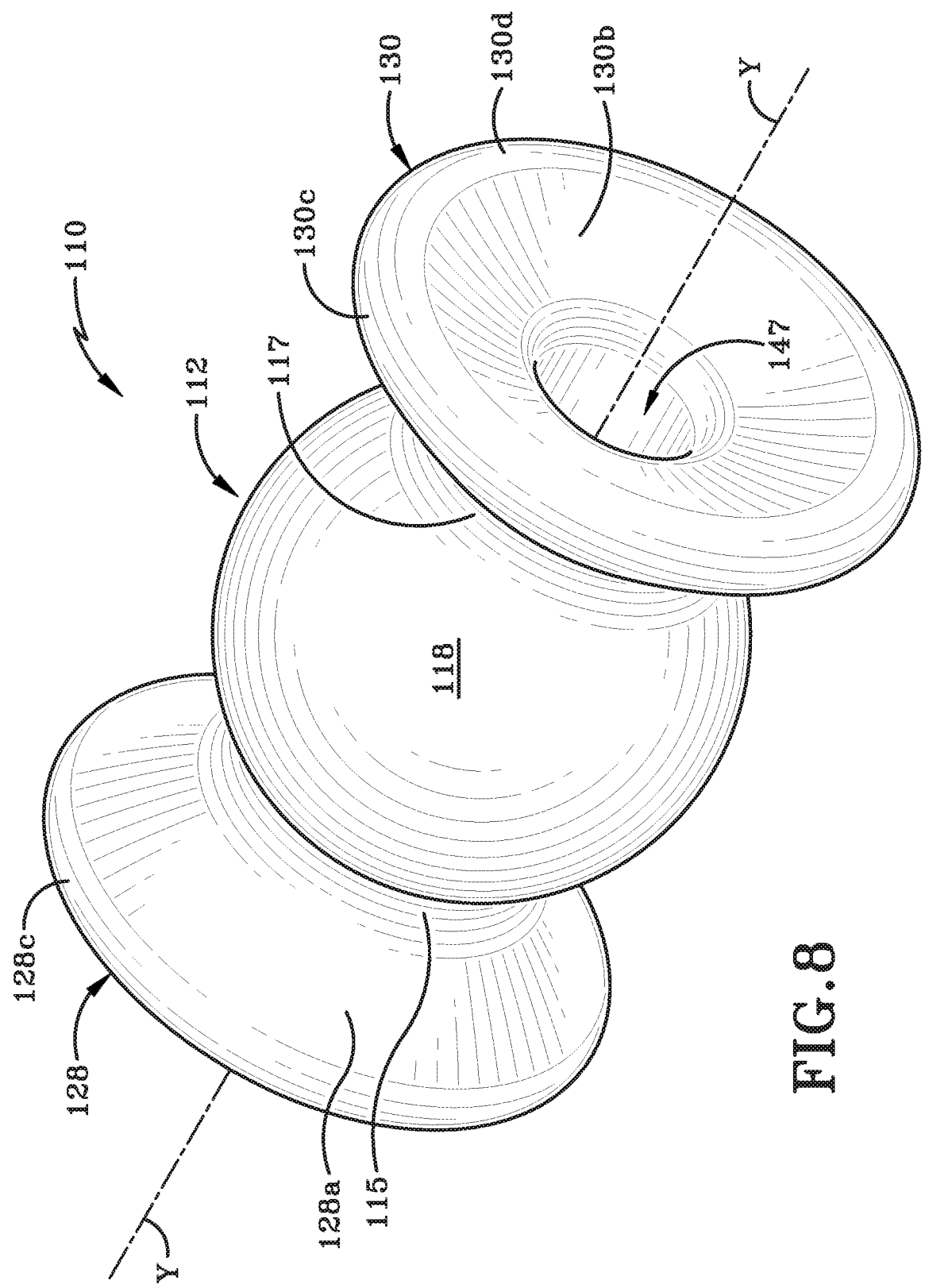
FIG. 8 is a perspective view of a second embodiment of a pet treat toy of the present disclosure.
Figure 9:
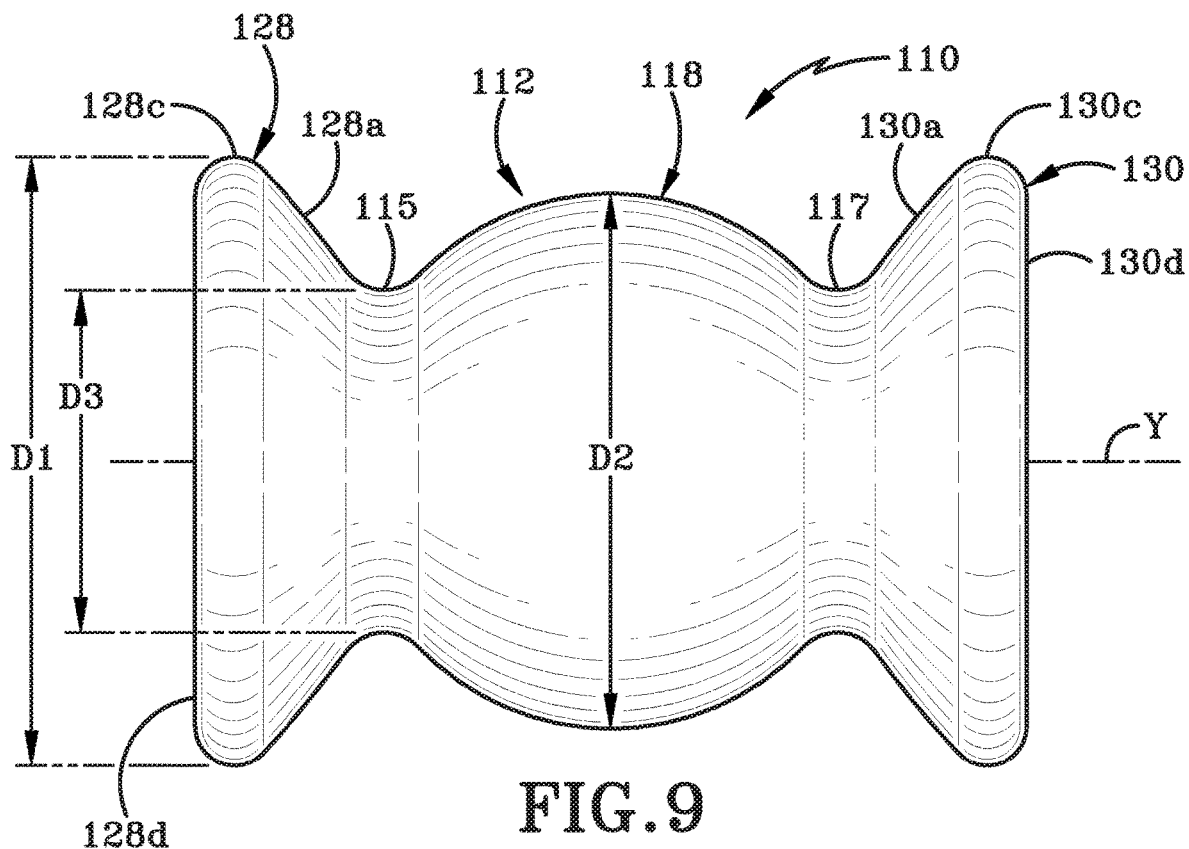
FIG. 9 is a front elevation view thereof; the unshown rear elevation view, front plan view, and back plan view all being substantially identical to the front elevation view.
Figure 10:
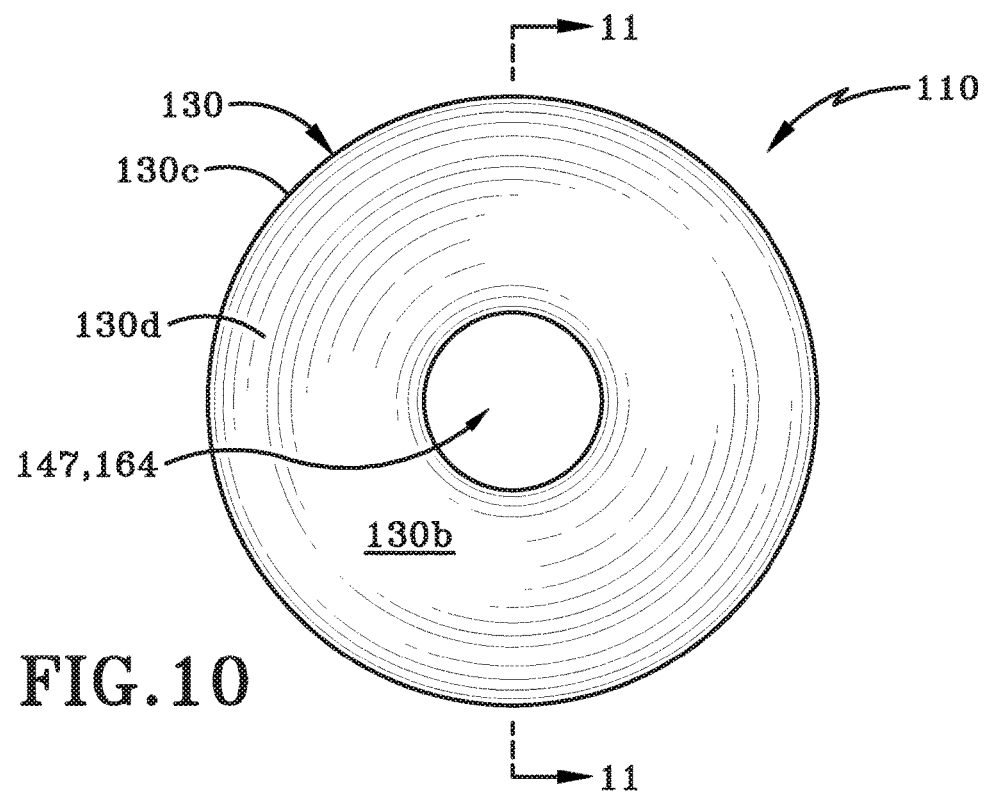
FIG. 10 is a right side elevation view thereof; the unshown left side elevation view being a mirror image thereof.

As shown in FIGS. 7A and 7B, a pet owner may insert one or more hard treats, such as treats "T", into interior cavity 64 through either of openings 46, 47. Because of presence of the one or more arms "T2" on treats "T", the more treats that are inserted into interior cavity 64, the more arms "T2" interlock with each other. FIG. 7A shows a single treat "T" moving within interior cavity 64 from one position to another and rolling downwardly along the interior surface of the wall of body portion 18 and towards opening 46 as toy 10 is tipped from a generally horizontal orientation (shown in FIG. 4 and in phantom in various positions 10A in FIG. 7A) and onto its first end 14. Another single treat "T" is shown moving through the passageway 46 as the pet treat toy 10 is upended. Because only one treat "T" is located within interior cavity 64, it is relatively easy for that single treat "T" to move towards opening 46.

FIG. 7B, on the other hand, shows three treats "T" moving within interior cavity 64 and one treat located in opening 46. The pet treat toy 10 is, again, shown in phantom through various positions 10A as it is upended by a pet. As the various treats "T" roll around within interior cavity 64, the plurality of arms "T2" on the multiple treats "T" tend to interfere with each other and temporarily interlock the treats to each other. This temporary interference caused by the interlocking multiple arms "T2" tends to impede or delay the movement of any single treat "T" into the passageway 46. The pet has to manipulate the toy 10 by biting, chewing, rolling, or otherwise moving the toy 10 around until one of the treats "T" breaks free of its temporary engagement with the surrounding treats "T" and moves into the passageway 46. It will be understood that the larger the number of treats "T" inserted into interior cavity 64 of treat toy 10, the longer it will take for a pet to extract those treats "T" from toy 10. The temporary interlocking engagement between treats "T" therefore makes it substantially more interesting and challenging for a pet to force a single treat to exit through one of the openings 46, 47.

The pet owner may also insert a quantity of a semi-solid treat, such as peanut butter, into openings 46, 47, passageways 46', 47' and interior cavity 64. Additionally, a quantity of semi-solid treat may be applied to the exterior surface of treat toy 10, particularly to the exterior surface of body portion 18. Some of that semi-solid treat may be captured in the depressions between the nubbins 19, thereby making it harder for the pet to lick the peanut butter off the body portion 18. Because the diameter "D2" of body portion 18 is less than the diameter "D1" of first and second enlarged members 28, 30, any peanut butter or other semi-solid treat applied to body portion 18 will tend to be kept off surface "G" because the outermost tips of the nubbins 19 are spaced a distance "H" from surface "G".

As noted earlier herein, openings 46, 47 are spaced a distance "L1" inwardly from outermost ends 28d, 30d of first and second enlarged members 28, 30. Consequently, if a quantity of semi-solid treat is inserted into openings 46, 47 and a pet upends toy 10 onto one of the outermost ends 28d, 30d, the quantity of semi-solid treat in openings 46, 47 will be kept a distance "L1" off the surface "G". As a consequence, the surface "G" (whether a floor, carpet, piece of furniture, dog bed, etc.) will not easily have semi-solid treat smeared on it as the pet manipulates treat toy 10.

The regions of treat toy 10 into or onto which semi-solid pet treats may be introduced into or applied onto are therefore always kept elevated off surface "G". The configuration of treat toy 10 therefore helps to ensure that treats, particular semi-solid treats like peanut butter, will be less likely to come into contact with the surface "G" when the pet tries to remove the pet treat from the pet treat toy. This arrangement helps a pet owner keep various surfaces in their home much cleaner than would otherwise be the case.

Referring now to FIGS. 8-13A, there is shown a second embodiment of a pet treat toy in accordance with the present invention, generally indicated at 110. Treat toy 110 is substantially identical to treat toy 10 except for a few differences that will be discussed hereafter. Treat toy 110 includes a body 112 that is generally shaped in the form of a dumbbell. Body 112 includes a first enlarged member 128, a second enlarged member 130, and a substantially spherical body portion 118 that extends between first enlarged member 128 and second enlarged member 130. Body 112 defines a longitudinal direction between first enlarged member 128 and second enlarged member 130 and a longitudinal axis "Y" (FIG. 11) extends centrally between the first enlarged member 128 and the second enlarged member 130.

The wall that defines body portion 118 is spherically curved and a valley 115 separates body portion 118 from first enlarged member 128. A valley 117 separates body portion 118 from second enlarged member 130. The wall of body portion 118, the valleys 115, 117, and the first and second enlarged members 128, 130 are substantially continuous with each other. The wall of body portion 118 differs from the wall of body portion 18 in that the nubbins 19 are omitted therefrom. As a consequence, the exterior surface of the wall of body portion 118 is substantially smooth and unbroken.

First and second enlarged members 128, 130 are disc-like enlarged regions that have an exterior surface 128a, 130a (FIG. 11) that is generally convex in shape and an interior surface 128b, 130b that is generally concave in shape. Each of first and second enlarged members 128, 130 has an outermost circumferential edge 128c, 130c and an end surface 128d, 130d. First and second enlarged members 128, 130 may be substantially identical to first and second enlarged members 28, 30, respectively, and will therefore not be described further herein. The maximum diameter of first enlarged member 128 and second enlarged member 130 may be substantially identical and may be defined as the diameter of the circumferential edge 128c, 130c. That diameter is indicated by the reference number "D1" and is substantially equivalent to the maximum diameter of the enlarged members 28, 30. Body portion 118 has a smaller diameter "D2" than the first and second enlarged members 128, 130 and valleys 115, 117 have an even smaller diameter "D3" than the diameters "D1" or "D2".

Figure 11:
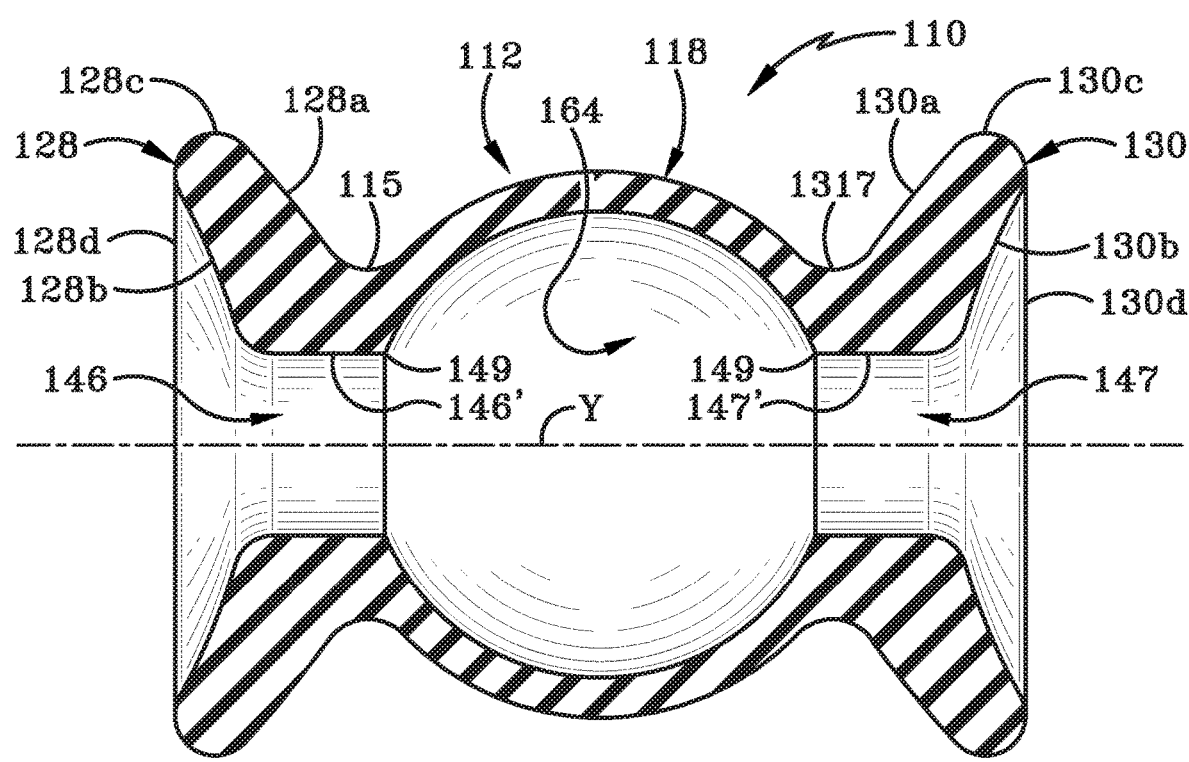
FIG. 11 is a longitudinal cross-section of the pet treat toy taken along line 35-35 of FIG. 10.
Figure 12:
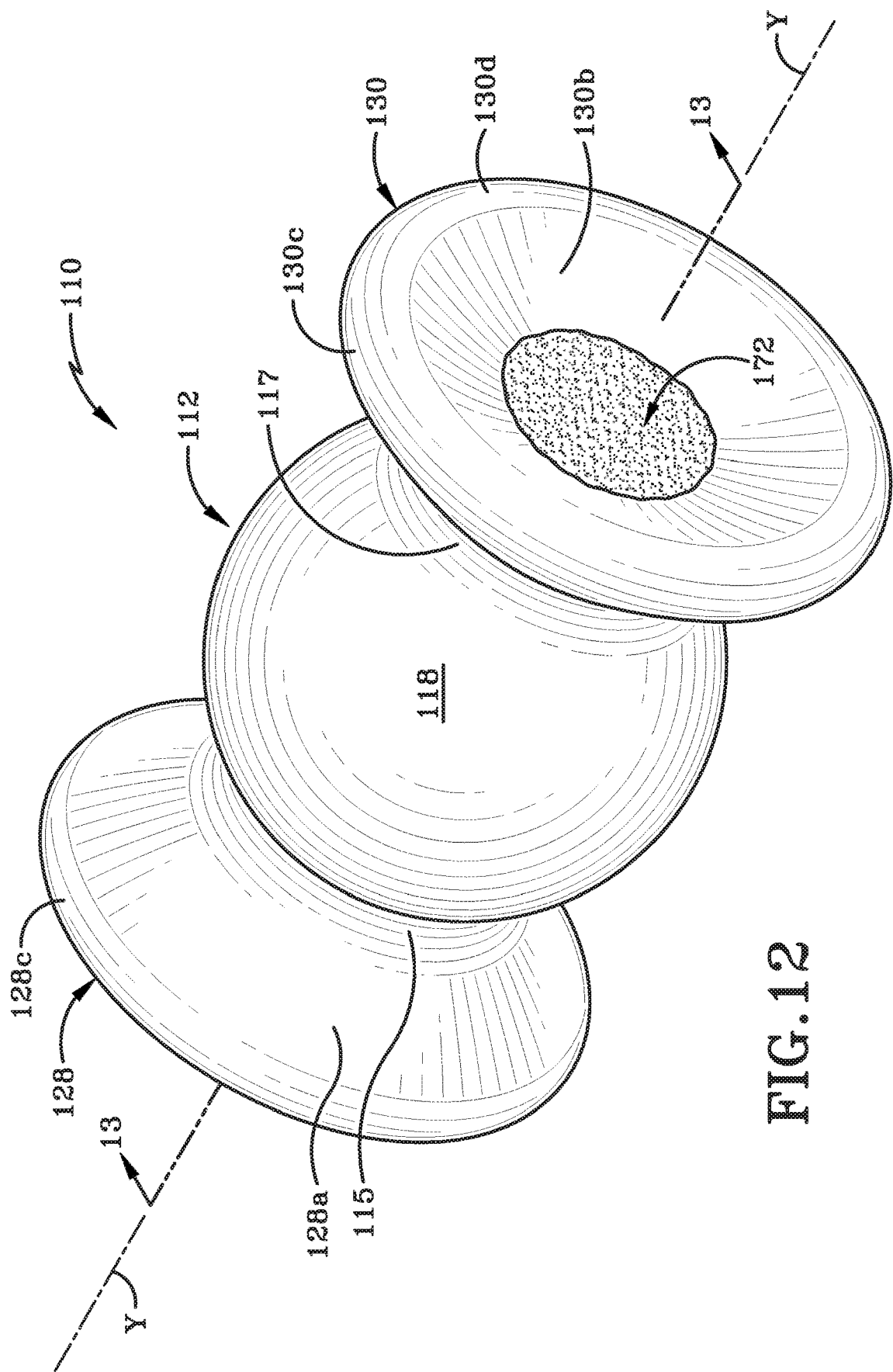
FIG. 12 is a perspective view of the pet treat toy of FIG. 8 shown loaded with a quantity of a semi-solid treat.

FIG. 11 shows that first enlarged member 128 defines an opening 146 in concave interior surface 128b and second enlarged member 130 defines an opening 147 in concave interior surface 130b. Openings 146, 147 are therefore recessed relative to the end surfaces 128d, 130d, respectively in a substantially identical manner to openings 46, 47 and end surfaces 28d, 30d. Openings 146, 147 are in fluid communication with an interior cavity 164 that is bounded and defined by the wall of body portion 118.

As is evident from FIG. 11, each of the openings 146, 147 may be configured as a longitudinally elongate passageway 146', 147' that originates in the associated concavely curved surface 128b, 130b and extends inwardly toward a central region of the spherically-shaped body portion 118. The elongate passageways 146', 147' may be longitudinally aligned with each other because the openings 146 and 147 are centrally positioned within curved surfaces 128b, 130b, respectively. In other examples, one or both of the openings 146, 147 may be offset relative to longitudinal axis "Y". If both openings 146, 147 are offset in the same direction and to the same degree relative to longitudinal axis "Y", then the elongate passageways 146', 147' will be longitudinally aligned with each other. However, if the openings 146, 147 are offset relative to each other, then the elongate passageways 146', 147' will also be offset from each other. In this latter instance, the offset elongate passageways may be substantially parallel to each other and to the longitudinal axis "Y". A pet owner may insert hard treats, such as the treat "T" shown in FIGS. 5 and 6, into interior cavity 164 through either of openings 146, 147. In other instances, the pet owner may insert semi-solid treats 172 (FIGS. 12 and 13), such as peanut butter, into passageways 146', 147' and interior cavity 164 through one or both openings 146, 147. The sharp edge 149 at the transition between interior cavity 164 and the passageway(s) 146', 147' helps to ensures that if the pet owner inserts a semi-solid treat 172 into interior cavity 164, then the semi-solid treat 172 cannot easily move past the edge 1349 because of the edge's shape until the pet bits, chews or otherwise manipulates treat toy 110.

Figure 13:
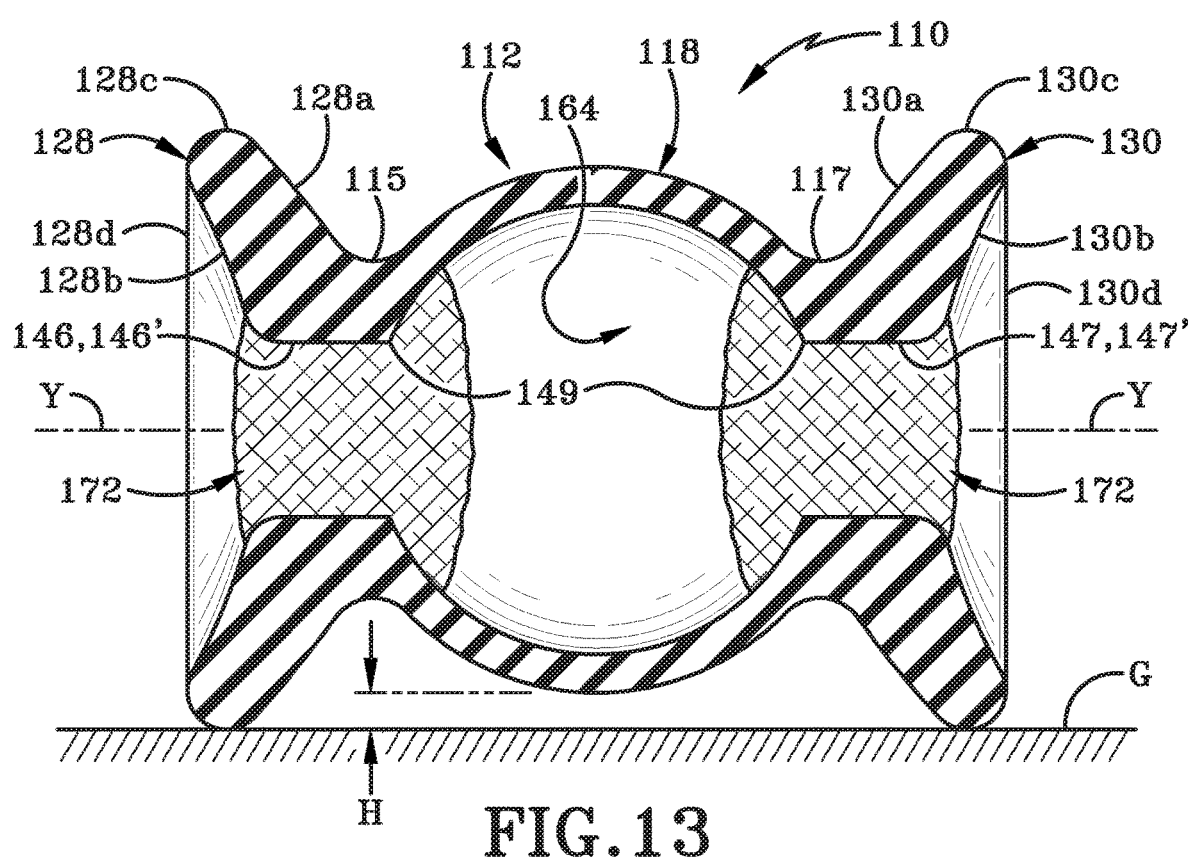
FIG. 13 is a longitudinal cross-section of the pet treat toy of FIG. 12 taken along line 37-37 of FIG. 12 and showing that the semi-solid treat is substantially retained inside the annular inclined end region of the pet treat toy.
Figure 13A:
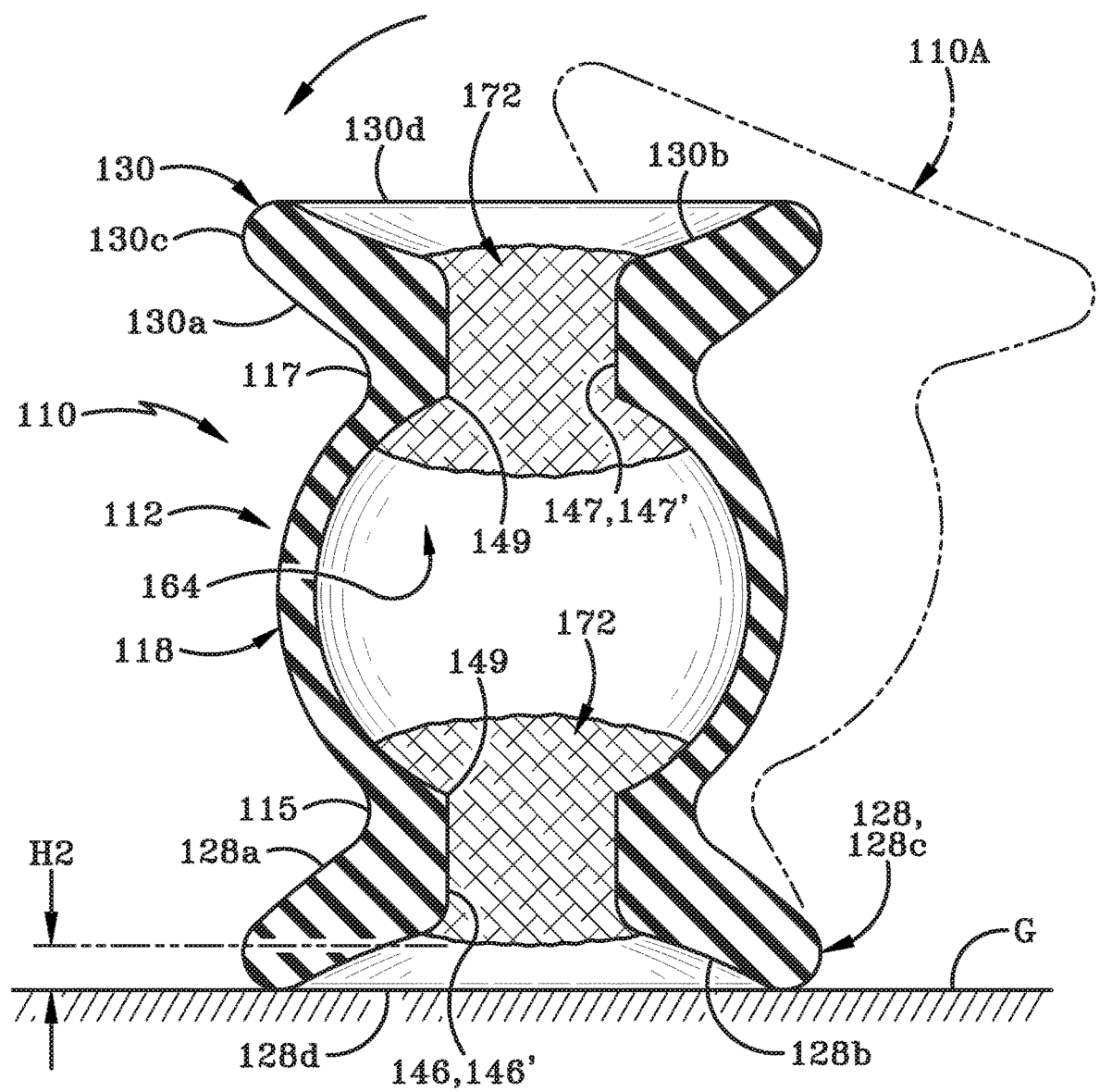
FIG. 13A is a longitudinal cross-section of the pet treat toy of FIG. 13 shown standing on one end on a floor surface and further showing that the semi-solid treat is substantially prevented from directly contacting the floor surface by being substantially retained inside the annular inclined end region of the pet treat toy.
Figure 14:
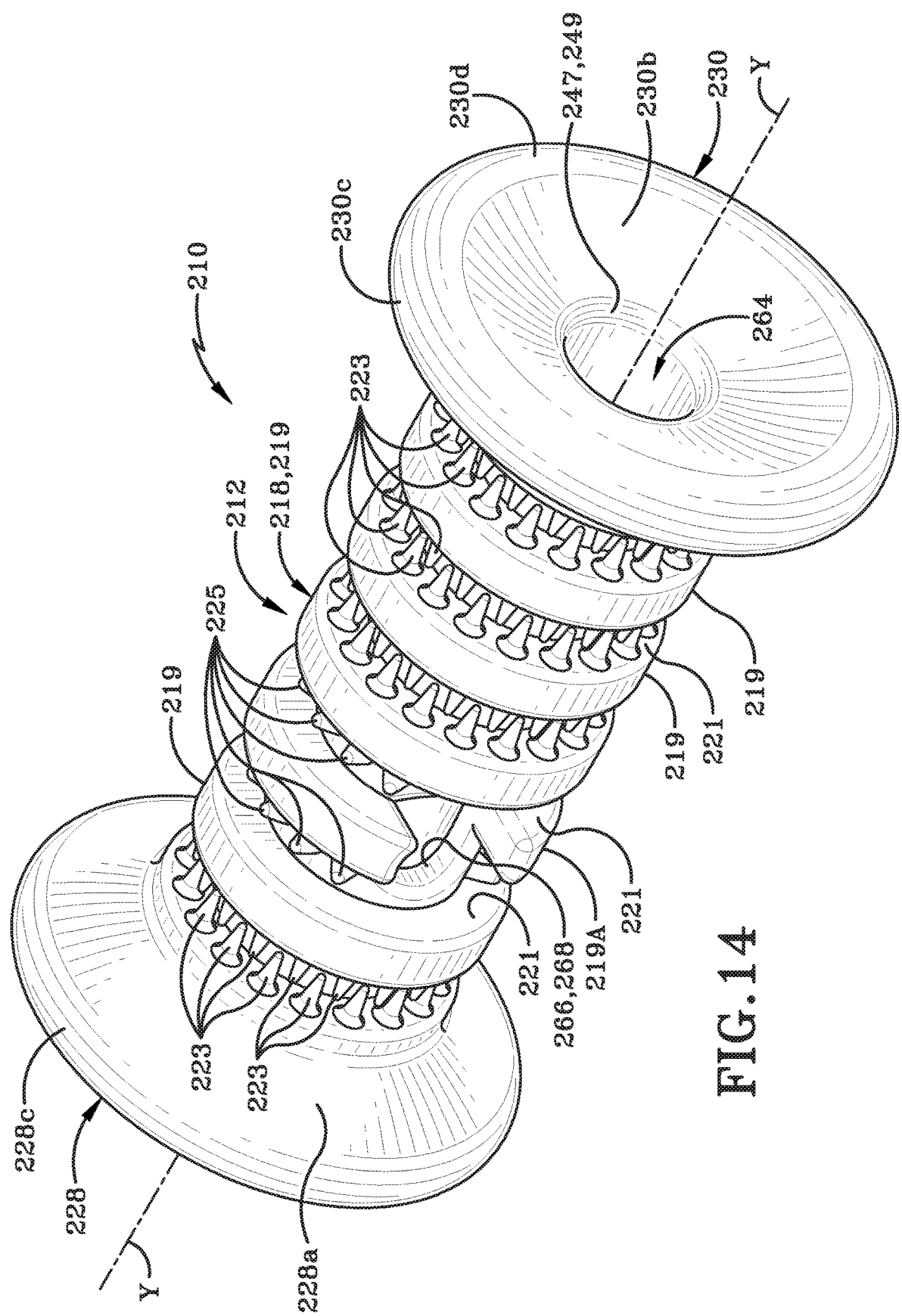
FIG. 14 is a perspective view of a third embodiment of a pet treat toy of the present disclosure.

The concave or conical shape of the interior surfaces 128b, 130b and the recessing of openings 146, 147 relative to end surfaces 128d, 130d helps to ensure that semi-solid treats 172 tend to be kept some distance inwardly away from end surfaces 128d, 130d, even if treat toy 110 is upended by the pet as shown in FIG. 13A as he or she is attempting to get at the peanut butter. This is partially because the opening 146, 147 is recessed relative to the edges 128d, 130d and partially because any escaping peanut butter, for example, will tend to flow onto and adhere to the concave surfaces 128b, 130b. FIG. 13 and FIG. 13A show treat toy 110 with a quantity of semi-solid treat 172 in interior cavity 164 and in the passageways 146', 147' and openings 146, 147. FIG. 13A shows an upended treat toy 110 (and a partially upended treat toy 110A in phantom). In both of FIGS. 37 and 37A, it may be seen that the configuration of the first and second enlarged members 128, 130 causes body portion 118 and openings 146, 147 to be retained a distance away from the surface "G" upon which treat toy 110 rests. If semi-solid treat 172 is applied to the exterior surface of body portion 118, then that treat 172 will be located a distance "H" off the surface "G" when the toy 110 rests on first and second enlarged members 128, 130 as in FIG. 13. If the treat toy 110 is upended and rests on first enlarged member 128 as shown in FIG. 13A, the semi-solid treat 172 is located a distance "H2" off surface "G". The semi-solid treat 172 is therefore substantially prevented from coming into contact with surface "G" whether treat toy 110 is on the circumferential edge 128c, 130c or on the end surface 128d or 130d. If the semi-solid treat 172 starts to "flow" out of one or both openings 146, 147, the treat 172 may tend to coat portions of the concave surface 128b, 130b, thus limiting a quantity of the treat 172 that might come into contact with the surface "G" upon which the associated first enlarged member or second enlarged member 128, 130 rests. The curvature of concave surfaces 128b, 130b present at opening 146, 147 also present the pet with more of a challenge to access a solid treat "T" or semi-solid treat 172 that may be present in treat toy 110.

Referring now to FIGS. 14-20 there is shown a third embodiment of a pet treat toy in accordance with the present disclosure, generally indicated by the reference number 210. Treat toy 210 includes a body 212 that is generally shaped in the form of a dumbbell. Body 212 has two enlarged members and an elongated body portion that is of a narrower diameter than the enlarged members and extends between the enlarged members. More particularly, body 212 may include a first enlarged member 228, a second enlarged member 230, and a narrower diameter body portion 218 that extends between first enlarged member 228 and second enlarged member 230. Body portion 218 may be a generally cylindrical or tubular member that is of a substantially constant diameter between first enlarged member 228 to second enlarged member 230.

Body 212 defines a longitudinal direction between first enlarged member 228 and second enlarged member 230 and a longitudinal axis "Y" (FIG. 16) extends centrally between the first enlarged member 228 and the second enlarged member 230. An exterior wall of body portion 218 may be oriented substantially parallel to and concentric with longitudinal axis "Y".

Figure 17:
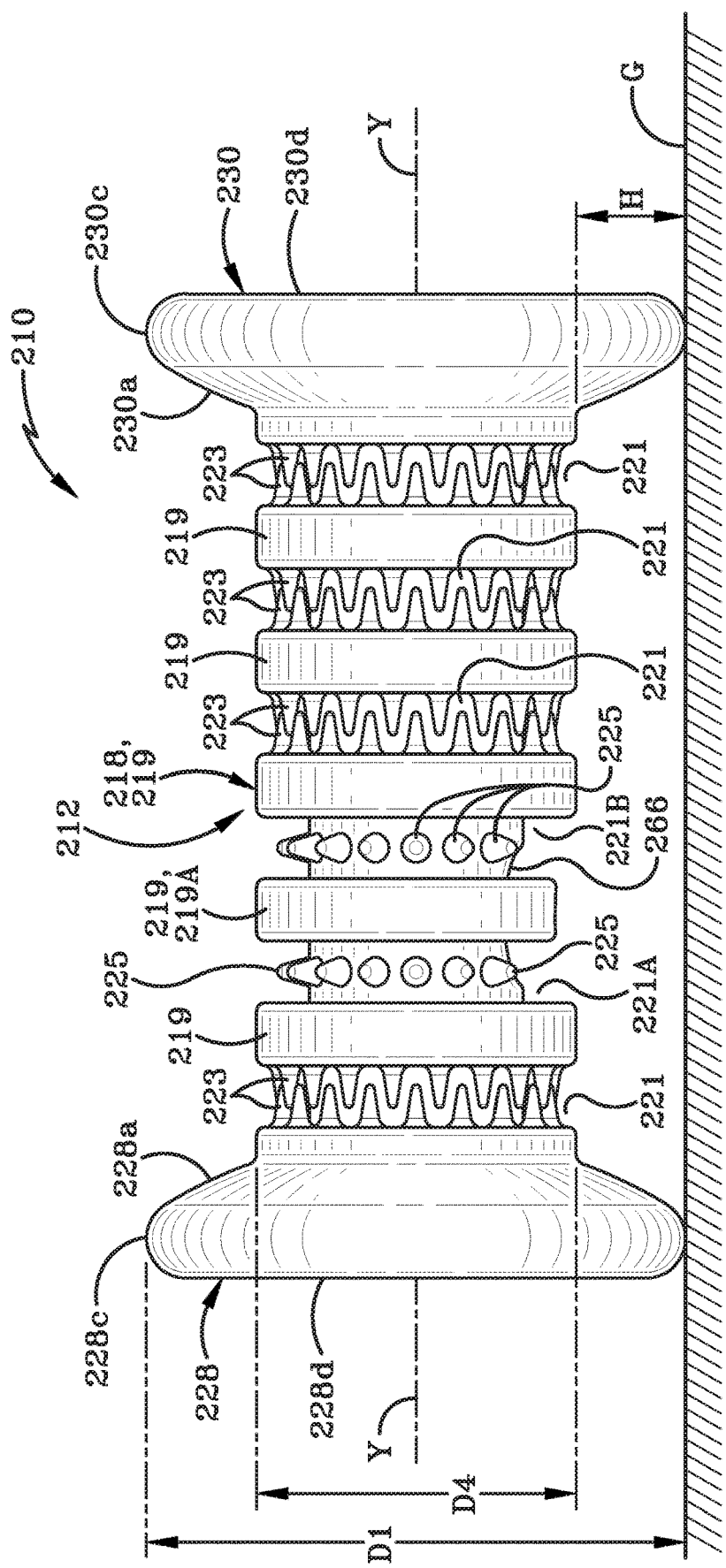
FIG. 17 is a top plan view thereof, the unshown bottom plan view being a mirror image thereof.

First and second enlarged members 228, 230 are disc-like enlarged regions that have an exterior surface 228a, 230a (FIG. 20) that is generally convex in shape and an interior surface 228b, 230b that is generally concave in shape. First and second enlarged members 228, 230 also have circumferential outer edges 228c, 230c, respectively, and end surfaces 228d, 230d, respectively. Outer edges 228c, 230c have a maximum diameter "D1" (FIG. 17) proximate end surfaces 228d, 230d. Openings 246, 247 are defined in first and second enlarged members 228, 230, respectively, and openings 246, 247 are recessed a length "L1" (FIG. 20) from the respective end surfaces 228d, 230d. FIG. 17 also shows that body portion 218 has a maximum diameter "D4" that is less than the diameter "D1". Consequently, when the outer edges 228d, 230d of first and second enlarged members 228, 230 rest on surface "G", body portion 218 is held a distance "H1" off of the surface "G".

Figure 18:
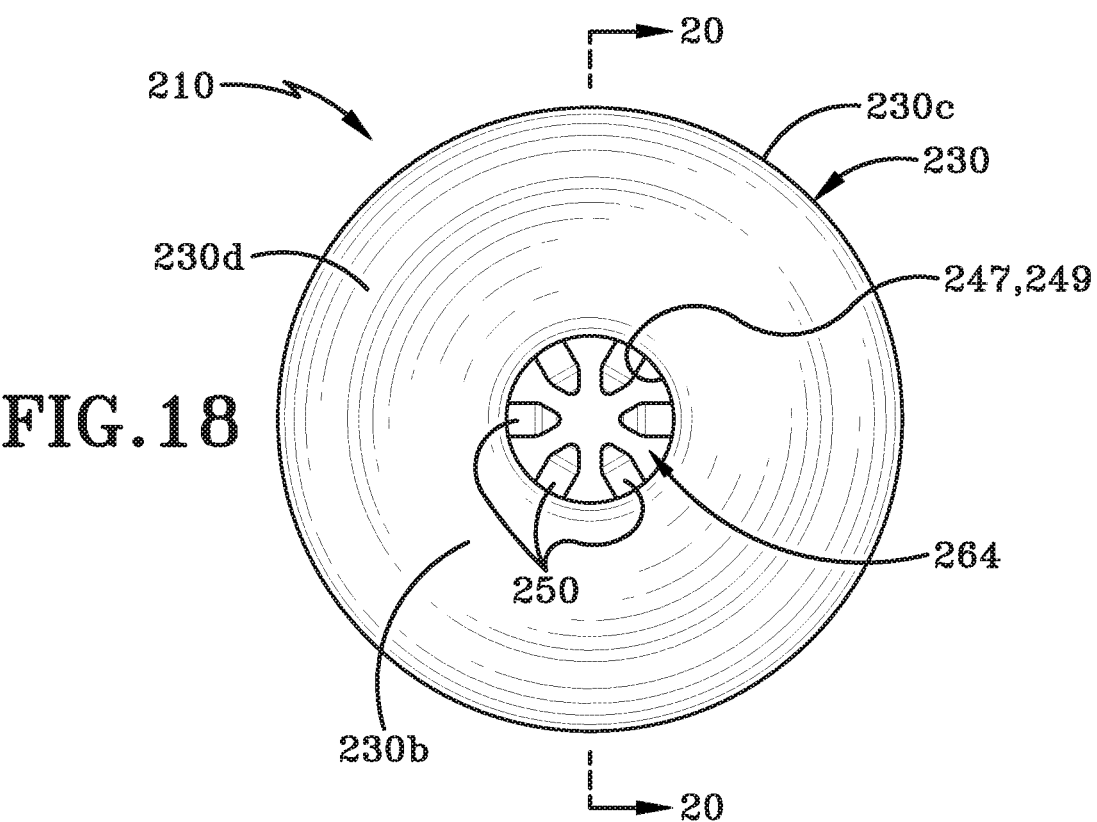
FIG. 18 is a right side elevation view thereof.
Figure 19:
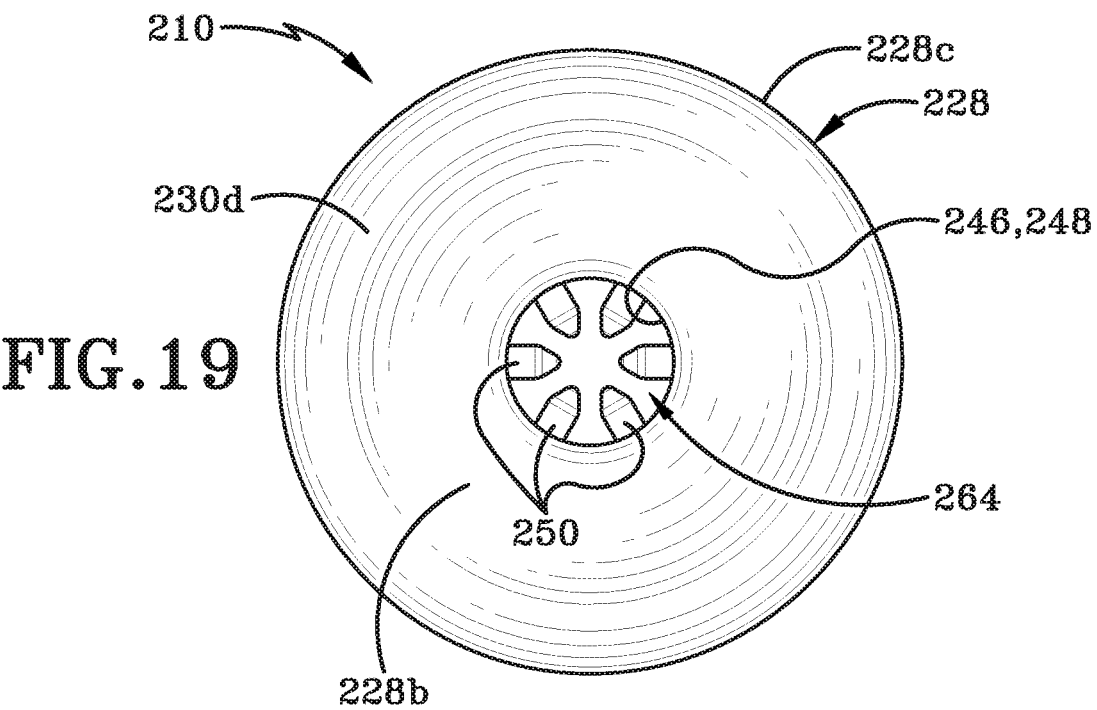
FIG. 19 is a left side elevation view thereof.
Figure 20:
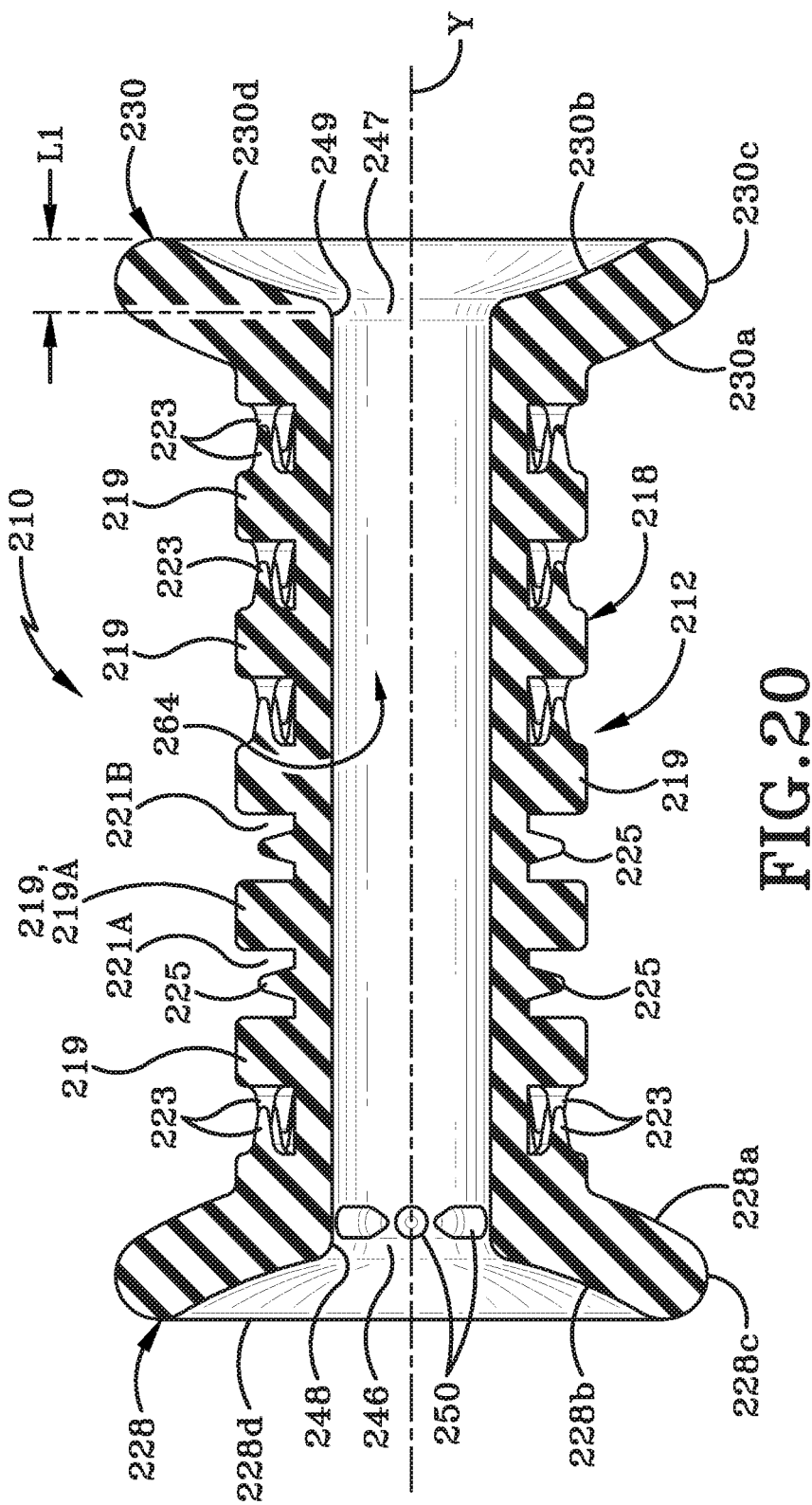
FIG. 20 is a longitudinal cross-section taken along line 20-20 of FIG. 18.
Figure 21:
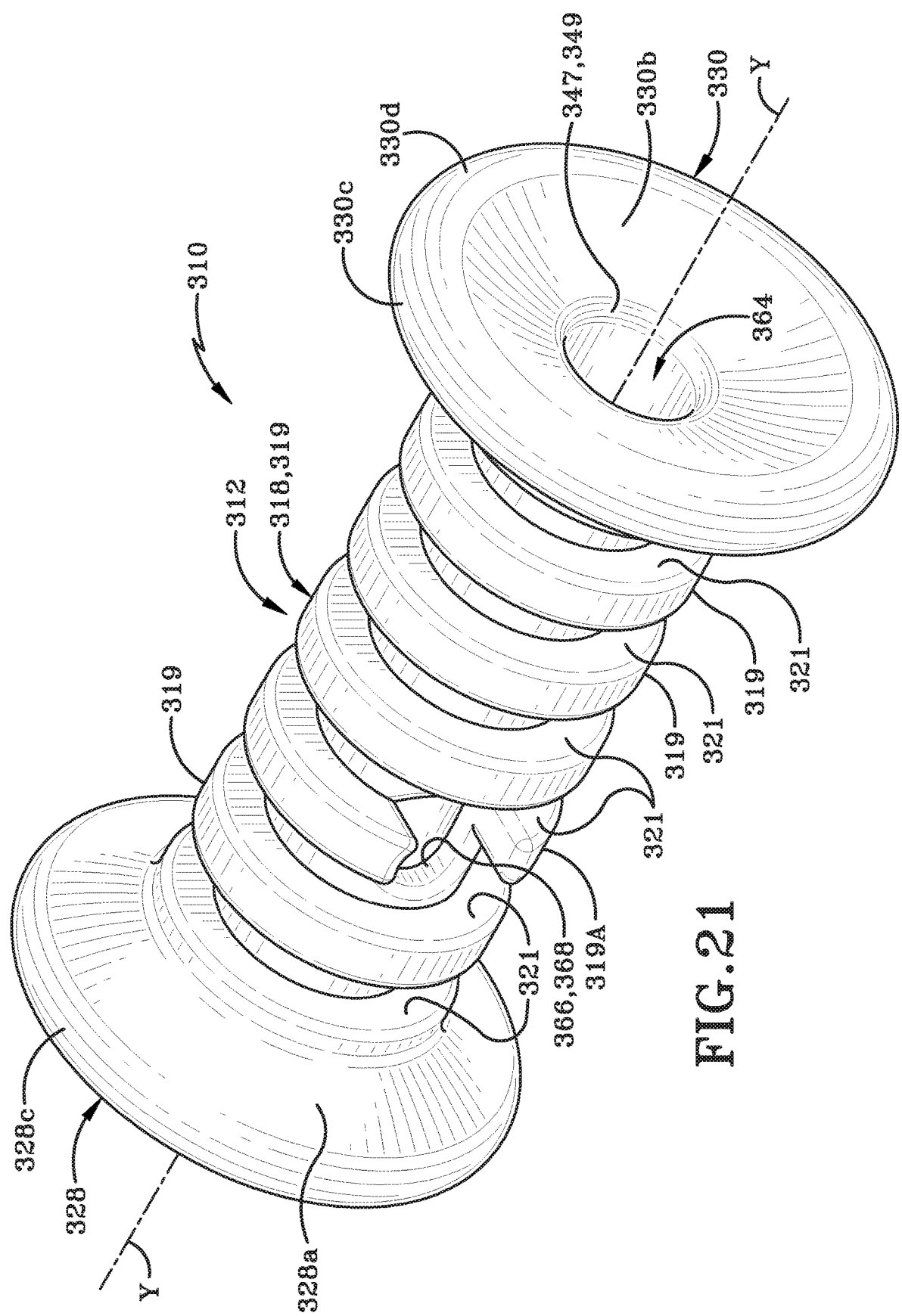
FIG. 21 is a perspective view of a fourth embodiment of a pet treat toy of the present disclosure.
Figure 23:
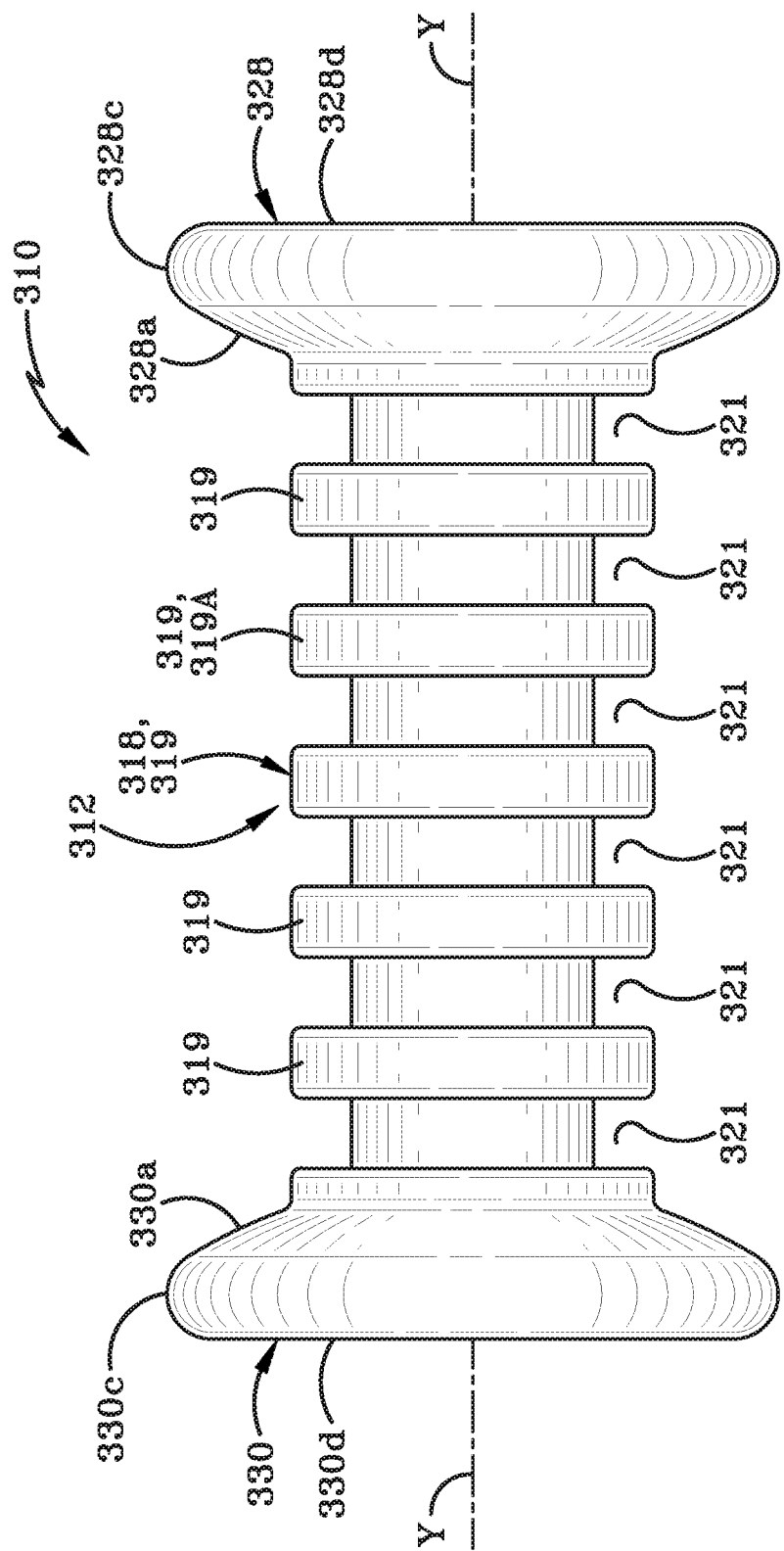
FIG. 23 is a rear elevation view thereof.
Figure 24:
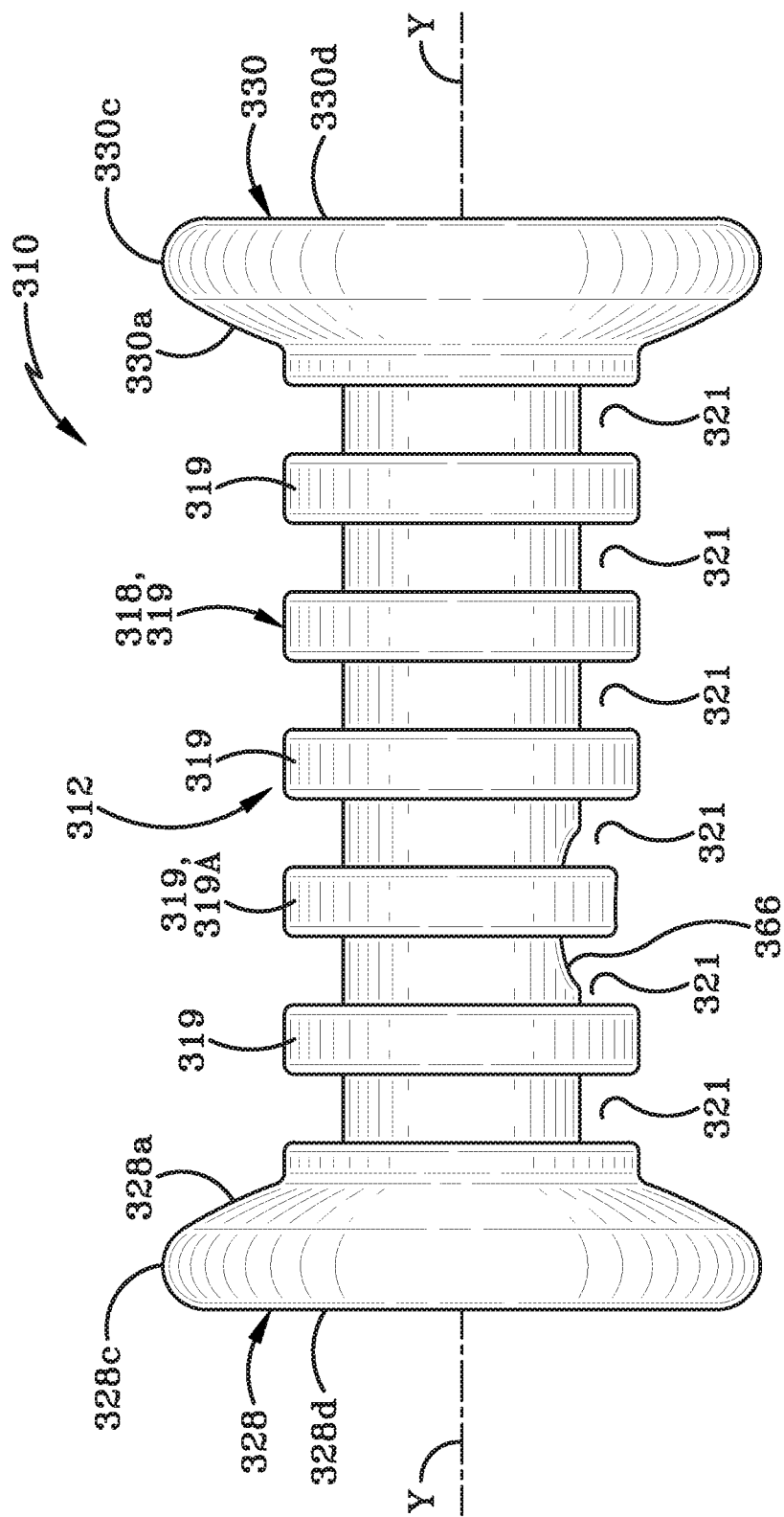
FIG. 24 is a top plan view thereof; the unshown bottom plan view being a mirror image thereof.
Figure 25:
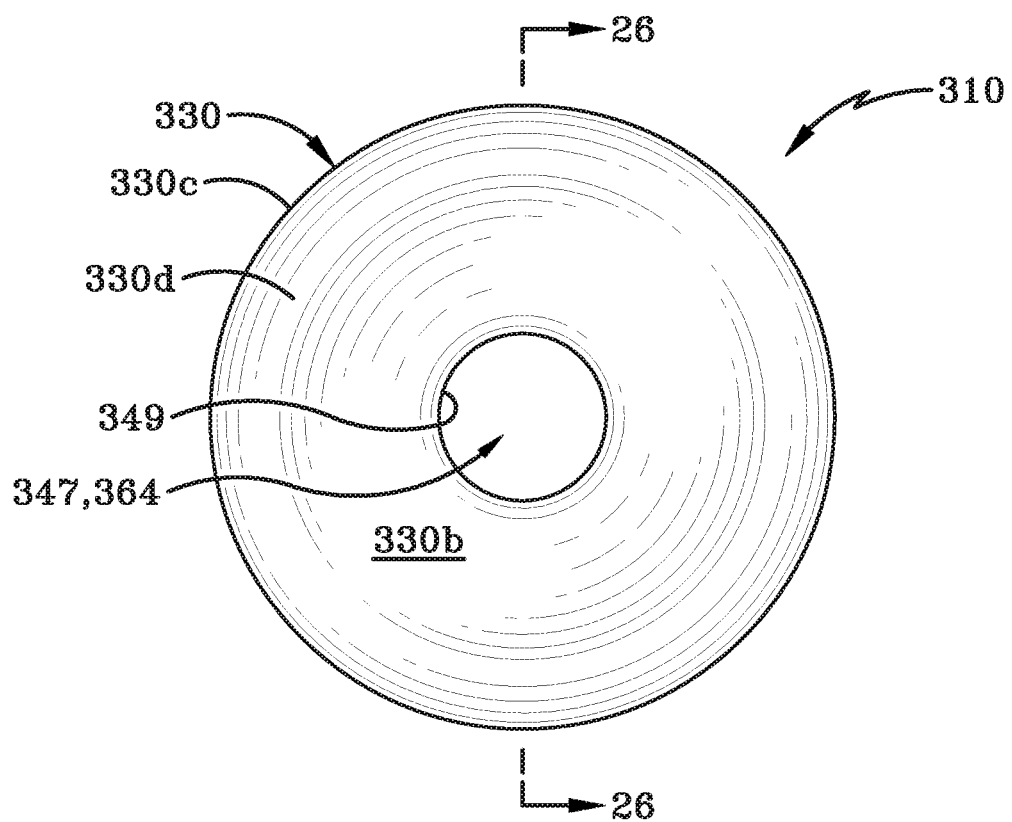
FIG. 25 is a right side elevation view thereof, the unshown left side elevation view being a mirror image thereof.
Figure 26:
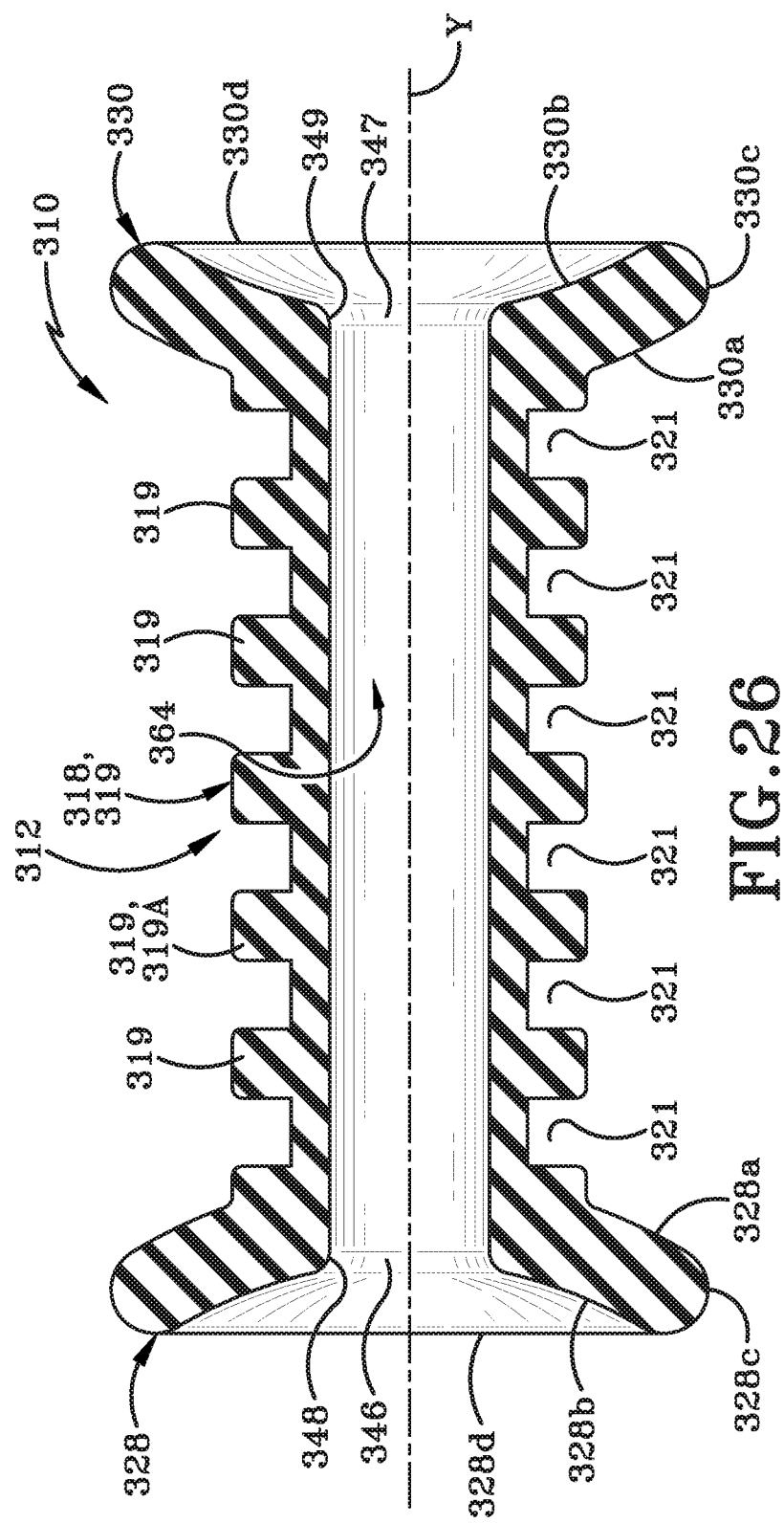
FIG. 26 is a longitudinal cross-section of the pet treat toy taken along line 26-26 of FIG. 25.

Apart from one or two features, the first and second enlarged members 228, 230 are substantially identical to first and second enlarged members 28, 30, respectively, and will therefore not be described further herein. The differences between first and second enlarged members 228, 230 relative to first and second enlarged members 28, 30 are related to the openings 246, 247 defined generally centrally in the concave surfaces 228d, 230d thereof. Referring to FIGS. 18 to 20, first enlarged member 228 is substantially identical to first enlarged member 28 except instead of opening 246 being circular in shape, the opening may be a substantially star-shaped opening 246. Opening 246 is defined by a peripheral edge 248 of concave surface 228b. A plurality of lobes 250 is integrally formed with concave surface 228a and project radially inwardly into opening 246 from peripheral edge 248 and toward longitudinal axis "Y". Lobes 250 are spaced from each other around the circumference of opening 246. Adjacent lobes 250 are separated from each other by a gap (not numbered). Each lobe 250 tapers in diameter from edge 248 and inwardly toward longitudinal axis "Y". In other words, a free end of each lobe 250 is of a smaller circumference that the end of the lobe 250 adjacent edge 248. Second enlarged member 230 includes a generally circular opening 247 that is defined in concave surface 230b by a peripheral edge 249. Both of the openings 246, 247 are in fluid communication with an interior cavity 264 (FIG. 23) defined by an inner surface of the wall of body portion 218.

Figure 15:
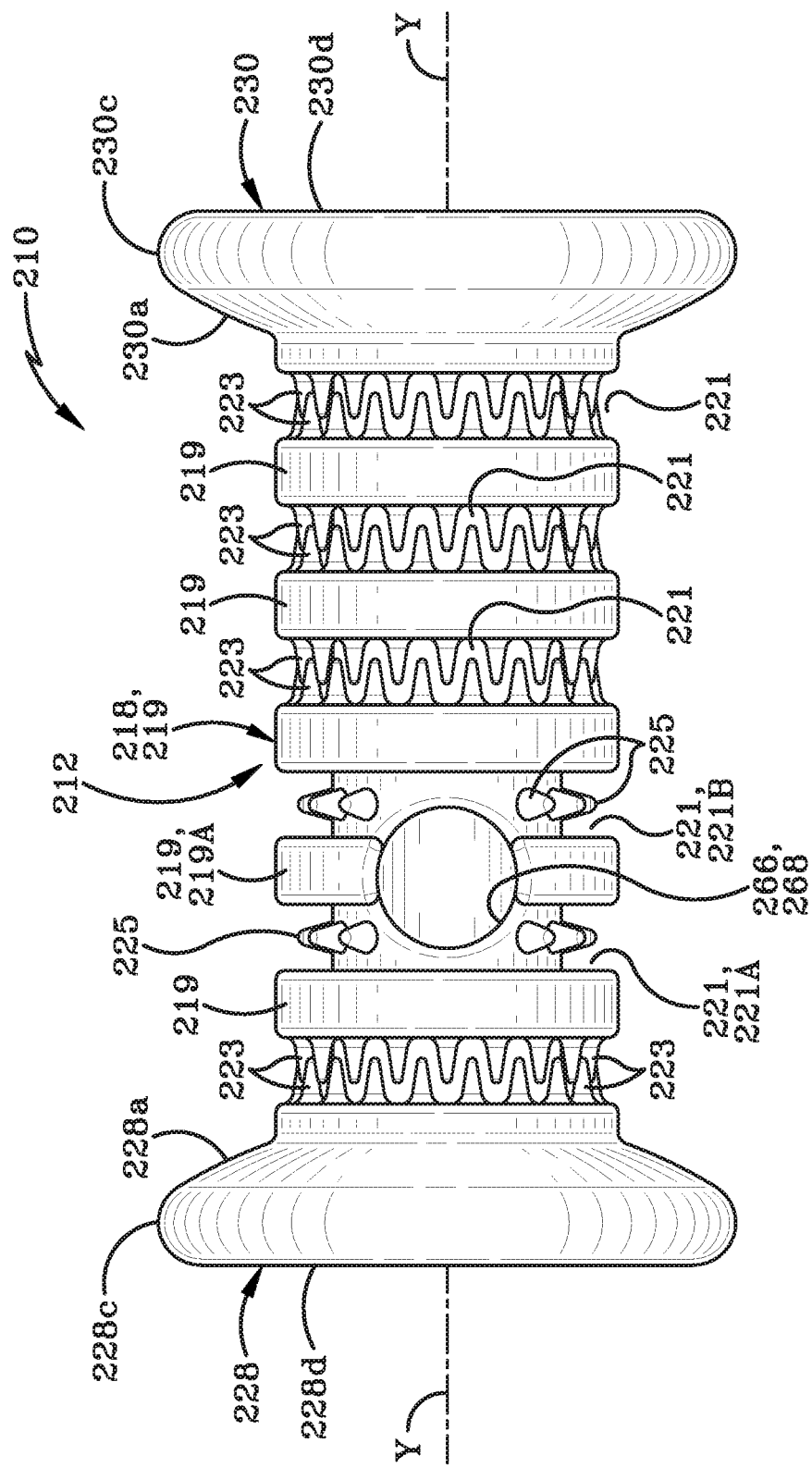
FIG. 15 is a front elevation view thereof.
Figure 16:
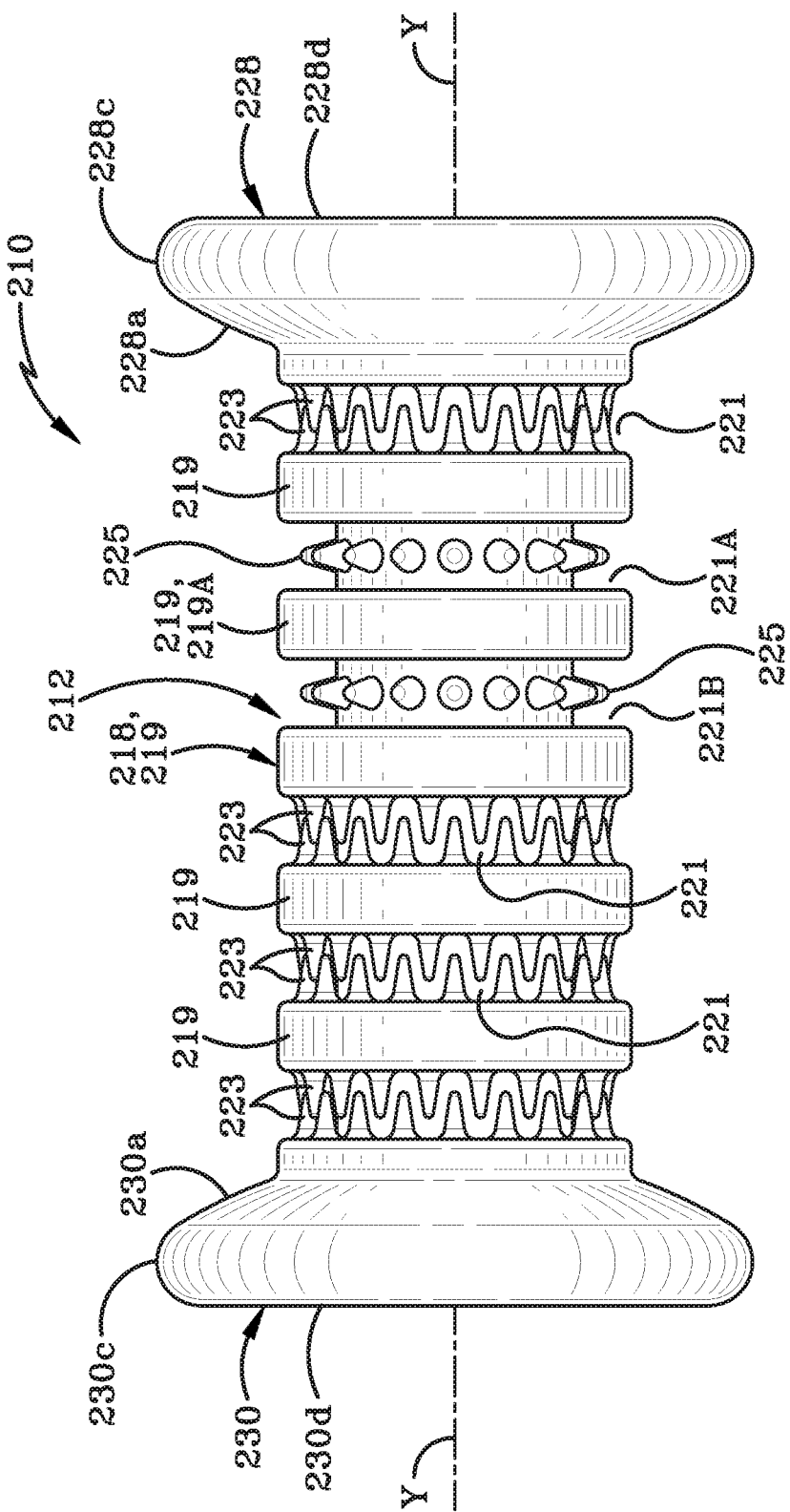
FIG. 16 is a rear elevation view thereof.

With continued reference to FIGS. 14 to 20, body portion 218 may comprise a tubular wall that is configured to include a plurality of alternating ridges 219 and troughs 221. Ridges 219 and therefore troughs 221, may be oriented generally at right angles to longitudinal axis "Y" (FIG. 15). In the example illustrated in FIGS. 14 to 20, wall 218 includes five ridges 219 and six troughs 221. It will be understood that in other examples, fewer than five ridges 219 or more than five ridges 219 may be provided, along with a corresponding number of troughs 221. Each of the ridges 219 except for the ridge 219A (FIGS. 14 and 15) extends around the circumference of body portion 218. Ridge 219A is interrupted by an opening 268 that is defined by a peripheral edge 266 of wall 218. Opening 268 is in fluid communication with interior cavity 264.

A plurality of first fingers 223 extend outwardly from one or both side surfaces of each ridge 219 except for ridge 219A. First fingers 223 may be oriented substantially parallel to longitudinal axis "Y" and may be positioned a distance above a region of wall 218 that defines a bottom region of trough 221. The first fingers 223 may all be generally conical in shape and taper in diameter in a direction moving away from the side surface of the associated ridge 219. First fingers 223 are spaced at intervals from each other on the side surface of the associated ridge 219. A first plurality of first fingers 223 provided on a first ridge are circumferentially offset relative to a second plurality of first fingers 223 provided on the adjacent ridge. The first plurality of first fingers 223 from a first ridge 219 are interleaved with the second plurality of first fingers 223 from the adjacent second ridge 219. Consequently, when the trough 221 is observed from above, the interleaved first plurality of first fingers 223 from the first ridge and the second plurality of first fingers from the adjacent ridge form a zig-zag pattern (see FIG. 15). Each first finger 223 is long enough to overlap a portion of the first fingers 223 extending outwardly from the opposed and adjacent ridge 219.

A plurality of second fingers 225 is provided in the troughs 221A, 221B defined on either side of ridge 219A. Each of the second fingers 225 extends radially upwardly from a portion of wall 218 that defines a bottom region of the associated trough 221A, 221B. Second fingers 225 may be generally conical in shape and taper in diameter moving in a direction radially outwardly from the bottom region of the associated trough 221A, 221B. Second fingers 225 are spaced at intervals around the circumference of wall 218.

A pet owner may insert a hard treat, such as treat "T" into interior cavity 264 through one of the openings 246, 247 and 268. The lobes 250 will tend to prevent treat "T" from exiting cavity 264 through opening 246. Openings 247 and 268 will permit treat "T" to exit cavity 264 therethrough when the pet bites, chews or otherwise manipulates treat toy 210.

If the pet owner decides to use a semi-solid substance, such as peanut butter 172 (FIG. 13A), as a treat, a quantity of the substance may be inserted into interior cavity 264 through any one of the openings 246, 247, 268. Alternatively or additionally, peanut butter may be spread onto a region of the exterior surface of the wall of body portion 218. The peanut butter will be spread over portions of at least some of the ridges 219 and enter at least some of the troughs 221 provided on body portion 218. Some peanut butter may be captured on, under or surrounding fingers 223, 225. Because body portion 218 is recessed relative to the outermost edges 228c, 230c of enlarged portions by height differential "H1" shown in FIG. 17, the peanut butter applied onto body portion 218 will be retained a distance off surface "G" upon which edges 228c, 230c rest. When a pet is given the peanut butter coated treat toy 210, they will lick the peanut butter off the body portion 218 but the differences in depth between the outermost surfaces of ridges 219 and the bottom regions of the troughs 221, as well as configuration and arrangement of the interleaving fingers 223 and fingers 225 will present the animal with a challenge to get at all of the peanut butter. This again makes the treat toy 210 more interesting to the pet and more time consuming to remove all of the treat therefrom. The ridges 219 also make it more difficult for the pet to get at peanut butter that has been inserted into interior cavity 264 through opening 268.

During an attempt to get peanut butter that has been inserted into interior cavity 264, a pet may land up upending treat toy 210 so that it rests upon one of the end surfaces 228d, 230d. In this instance, the concavity of surfaces 228b, 230b and the associated recessed opening 246, 247 that is located a distance "L1" off the surface "G" will help to stop peanut butter from coming into direct contact with the surface "G" upon which the respective end surface 228d, 230d rests. If peanut butter starts to "flow" out of opening 247, for example, the peanut butter may tend to flow onto sections of the surface 228b or 230b, coating the same in peanut butter. Since this surface 228b, 230b curves away from contact with surface "G", the peanut butter will tend not to be brought into contact with the surface "G. The curvature of concave surfaces 228b, 230b and the lobes 250 present at opening 246 may also present the pet with more of a challenge to access any peanut butter (and/or any hard treat "T") that may be present in interior cavity 265 of treat toy 210.

Referring now to FIGS. 21 to 26 there is shown a fourth embodiment of a pet treat toy in accordance with the present disclosure, generally indicated at 310. Treat toy 310 may include a body 312 that is generally shaped in the form of a dumbbell. Body 312 has two enlarged members and an elongated body portion that is of a narrower diameter that the enlarged members and extends between the enlarged members. More particularly, body 312 may include a first enlarged member 328, a second enlarged member 330, and a narrower diameter cylindrical body portion 318 that extends between first enlarged member 328 and second enlarged member 330. Body 312 defines a longitudinal direction between first enlarged member 328 and second enlarged member 330 and a longitudinal axis "Y" (FIG. 21) extends centrally between the first enlarged member 328 and the second enlarged member 330. An exterior wall of body portion 318 may be oriented substantially parallel to and concentric with longitudinal axis "Y".

First and second enlarged members 328, 330 are disc-like enlarged regions that have an exterior surface 5328a, 330a (FIG. 26) that is generally convex in shape and an interior surface 5328b, 330b that is generally concave in shape. Each of the first and second enlarged members 328, 330 also have outermost edges 328c, 330c, and outermost surfaces 328d, 330d. First enlarged member 328 is substantially identical to first enlarged member 228 except that first enlarged member 328 defines an opening 346 (FIG. 26) therein that is free of any lobes 250 or other obstructions and is simply generally circular in shape. Second enlarged member 330 is substantially identical to second enlarged member 230 and defines a generally circular opening 347 therein. Both of the openings 346, 347 are in fluid communication with an interior cavity 264 defined by an inner surface of the wall of body portion 318. In all other aspects, first enlarged member 328 and second enlarged member 330 are substantially identical in structure, function, are provided for the same purpose, and are used in the same manner as first enlarged members 28, 128, 228 and second enlarged members 30, 130, 230.

Figure 22:
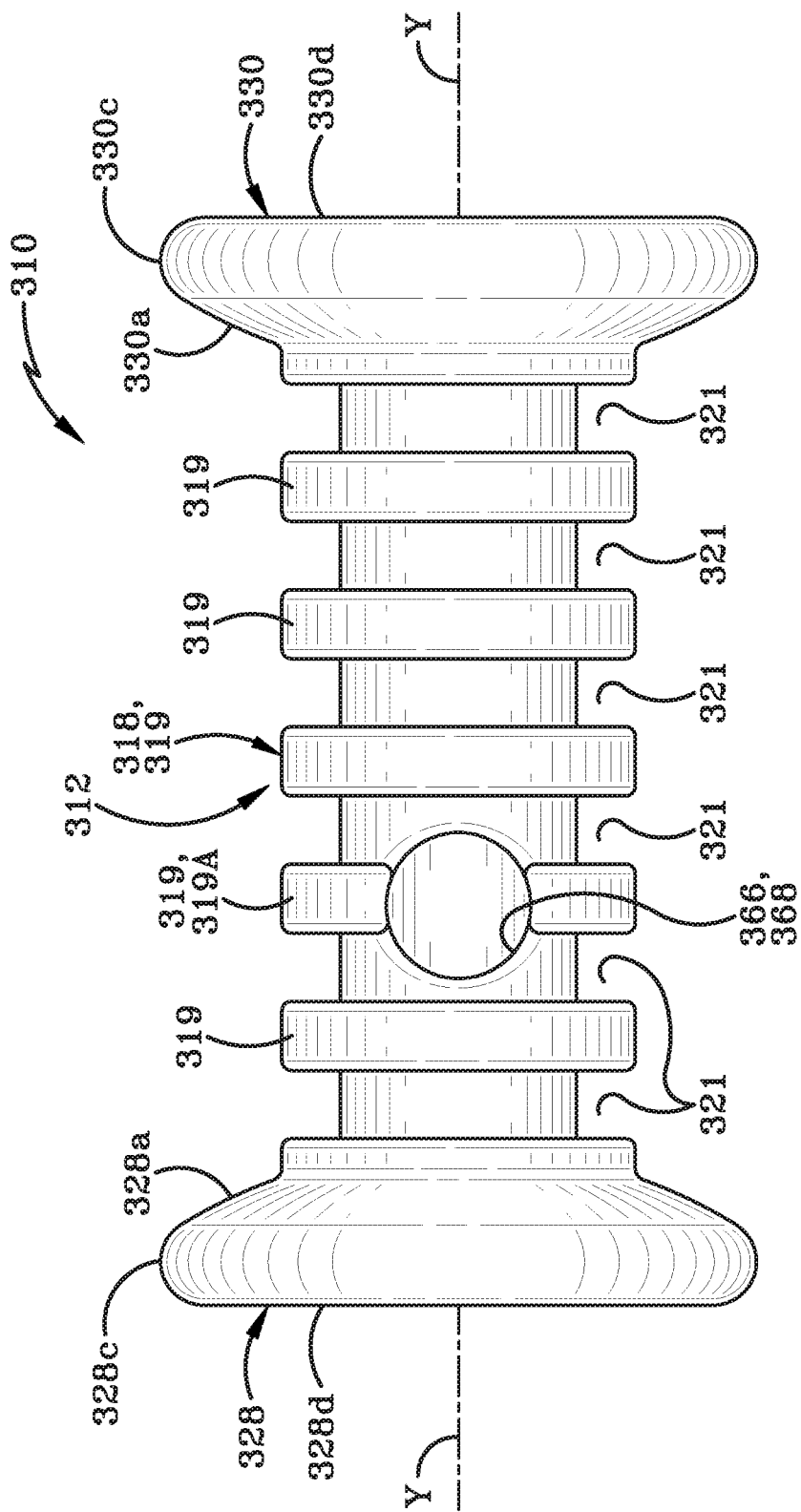
FIG. 22 is a front elevation view thereof.

With continued reference to FIGS. 21-26, body portion 318 may comprise a wall that is configured to include a plurality of alternating ridges 319 and troughs 321. Ridges 319, and therefore troughs 321, may be oriented generally at right angles to longitudinal axis "Y" (FIG. 22). In the example illustrated in FIGS. 21-26, wall 318 includes five ridges 319 and six troughs 321. It will be understood that in other examples, fewer than five ridges 319 or more than five ridges 319 may be provided, along with a complementary number of troughs 321. Each of the ridges 319, except for the ridge 319A, (FIGS. 21 and 22) extends around the circumference of body portion 318. Ridge 319A is interrupted by an opening 368 that is defined by a peripheral edge 366 of wall 318. Opening 368 is in fluid communication with interior cavity 364 and is therefore in fluid communication with openings 346, 347. As can be best seen in FIG. 24, peripheral edge 366 may be concavely curved with respect to the surfaces of ridge 319A and troughs 321 within which the opening 368 is defined.

Pet treat toy 310 differs from pet treat to 210 in that no first fingers or second fingers (similar to first and second fingers 223, 225) are formed on the side surfaces of ridges 319. Instead, the side surfaces of ridges 319 are substantially smooth and obstruction free. In substantially all other aspects, pet treat toy 310 is substantially identical in structure, function, and use to pet treat toy 210.

FIGS. 27-30 show a fifth embodiment of a pet treat toy in accordance with the present disclosure, generally indicated by the reference number 410. Treat toy 410 may include a body 412 that is generally shaped in the form of a dumbbell. The dumbbell shape of body 412 has two enlarged members and a narrowed diameter elongated, tubular body portion extending between the enlarged members. In particular, body 412 may include a first enlarged member 428 at first end 414 and a second enlarged member 430 at second end 416. The term enlarged with respect to the members 428, 430 refers to the diameter "D1" (FIG. 30) of the members 428, 430 that is greater than a diameter "D4" of body portion 418, where "D4" is smaller than "D1".

First enlarged member 428 and second enlarged member 430 each intersect the longitudinal axis "Y" in a generally orthogonal manner. Each enlarged member 428, 430 is shaped generally like a disc and is substantially identical in structure, function, and use, to the enlarged members 28, 30 described previously herein. Thus, as shown in FIG. 4, first enlarged member 428 has a major surface and a minor surface associated therewith. Second enlarged member 430 has a major surface and a minor surface associated therewith. The respective major surfaces of the first and second enlarged members 428, 430 intersect the longitudinal axis "Y". The minor surfaces associated with first enlarged member 428 and second enlarged member 430 extend circumferentially around the longitudinal axis "Y". In one particular example, the major surface of each of first enlarged member 428 and second enlarged member 430 may be concavely curved as has been described previously herein. In particular, the concavely curved surface may be generally conical in shape. Still further, the concavely curved surface may be shaped as a truncated conical shape. The minor surface of each of first enlarged member 428 and second enlarged member 430 may be a convexly curved outer surface.

First and second enlarged members 428, 430 may be substantially identical in structure and function to each other. The structure and function of first enlarged member 428 will be described in greater detail below but it should be understood that the description applies equally to second enlarged member 430. First enlarged member 428 may include a convexly curved outer surface 432 (i.e., the minor surface of enlarged member 428) extending circumferentially around the longitudinal axis "Y". The convexly curved outer surface 432 may be configured to come into contact with surface "G". The outer surface 432 is substantially continuous with a tapered portion 436 that narrows in and is continuous with elongated body portion 418. First enlarged member 428 further may include a concavely curved section 440 (i.e., the major surface of enlarged member 428) that extends inwardly toward the second side from an outer edge 442. The concave section 440 extends circumferentially around the longitudinal axis "Y" in a smooth and continuous manner. An innermost edge of concave section 440 bounds and defines an opening 446. Opening 446 may be generally centrally located in concave section 440 and may be recessed inwardly from an outermost end surface of first enlarged member 428 that is substantially identical to end surface 28*d*.

Figure 29:
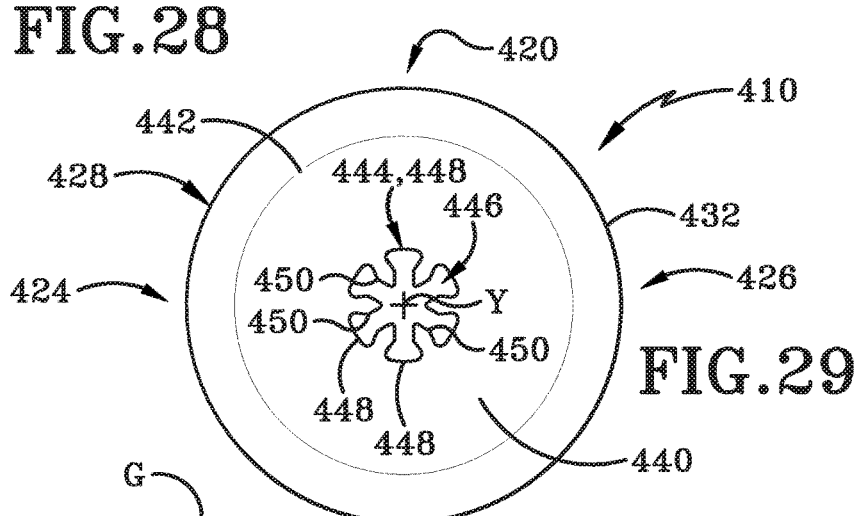
FIG. 29 is an end elevation view thereof.

As depicted in FIG. 29, the edge 444 defining the opening 446 may have any geometric shape. In one particular example, edge 444 may include a plurality of connected sections that define a star-shaped opening 446. Star-shaped opening 446 may be defined by a generally circular peripheral edge 448 that is periodically interrupted by a plurality of lobes 450 that extend inwardly toward longitudinal axis "Y". The star-shaped opening 446 is illustrated as including six lobes 450. However, it is entirely contemplated that the edge 444 defining the opening 446 may have any shape suitable to fit pet treats therethrough. For example, instead of a star-shaped opening 446 being defined by edge 444, the opening may simply be circular in shape.

Figure 28:
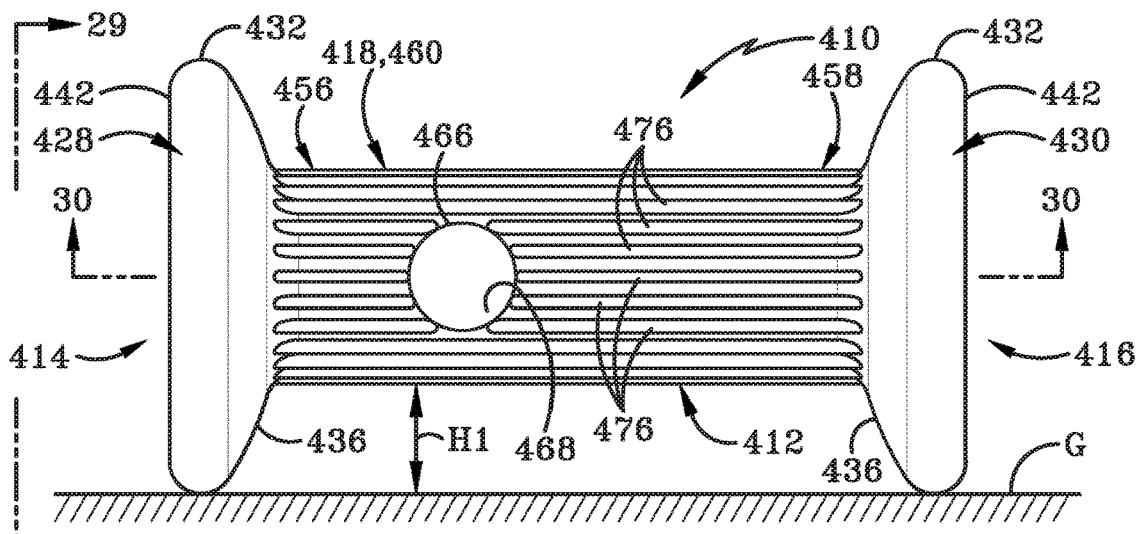
FIG. 28 is a side elevation view of the pet treat toy of FIG. 27.
Figure 30:
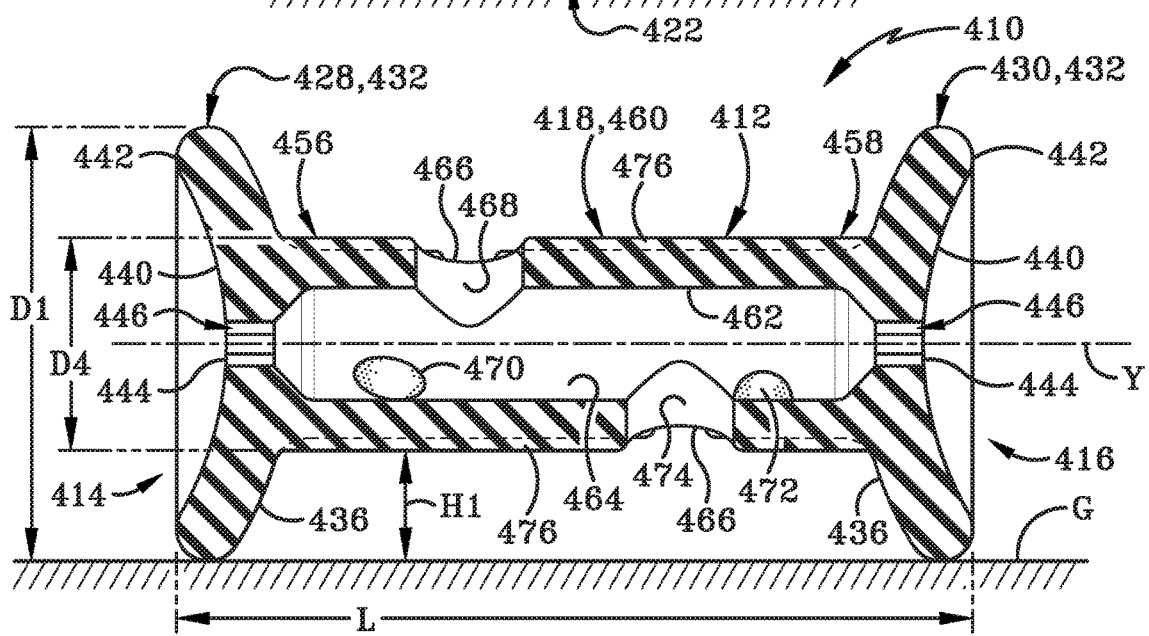
FIG. 30 is a longitudinal cross-section of the pet treat toy taken along line 30-30 of FIG. 28.

As depicted in FIGS. 28-30, second enlarged member 430 is similarly shaped in a mirrored manner to first enlarged member 428. Accordingly, for brevity, similar reference numerals are utilized on second enlarged member 430 to refer to similar components. For example, second enlarged member 430 may include convexly curved outer surface 432, a tapered portion 436 (which tapers towards the first end 414), a concave section 440, an outer edge 442, and an edge 444 defining an opening 446.

As depicted in FIG. 30, first enlarged member 428 has a diameter "D1" which is equal to the vertical height of the toy 410 when both the first and second enlarged members 428, 430 rest on the surface "G". In one particular example, the height of toy 410 (i.e., diameter "D1") of first enlarged member 428 may be in a range of from about two inches up to about four inches. Toy 410 further may be of a length "L" measured from the first end 414 to the second end 416. Length "L" may be in a range of from about three inches up to about eight inches. The body portion 418 may be of a smaller diameter "D4" that may be in a range of from about 0.75 inches up to about 1.5 inches. Accordingly, the body portion 418 may be raised a distance away from the surface "G" by a distance "H1". The distance "H1" may be in a range of from about one-half inch up to about one inch. It will be understood by those of ordinary skill in the art that the height (i.e., diameters "D1" and "D4")) of the various parts of toy 410 may be smaller or larger than the height discussed above. It will further be understood by those of ordinary skill in the art that the length "L" of the toy 410 may be smaller or larger than the lengths discussed above. As with previous embodiments, opening 446 may be recessed a distance "L1" inwardly from the outer end surfaces 442.

As with previous embodiments, the purpose of raising body portion 418 above the surface "G" is to allow a pet treat that is placed within cavity 464 to be kept in an elevated position where the treat is located a distance away the floor surface "G". This elevated position helps to ensure that the treat, particular semi-solid treats like peanut butter, will be less likely to come into contact with the floor surface "G" when the pet tries to remove the pet treat from the pet treat toy 410. This arrangement helps a pet owner keep the floor surfaces, carpets, furniture, dog beds, etc. in their home much cleaner than would otherwise be the case. In a similar fashion, the conical concave end surfaces of first and second enlarged members 428, 430 ensure that the opening 446 is recessed relative to the end surface thereof. Again, recessing the opening 446 to the interior cavity 464 helps to ensure that any pet treat will be less likely to come into contact with a floor surface "G" upon which the first enlarged member 428 or second enlarged member 430 rests.

With continued reference to FIG. 28 and FIG. 30, the body portion 418 generally may include a first end 456 and a second end 458. The first end 456 is connected with the tapered portion 436 of first enlarged member 428. The second end 458 of the body portion 418 is connected with the tapered portion 436 of second enlarged member 430. Accordingly, the body portion 418 extends between first enlarged member 428 and second enlarged member 430. In one particular example, the body portion 418 is a generally cylindrical member having an outer surface 460 and inner surface 462 defining interior cavity 464. The cavity 464 is generally cylindrical, extending centrally along the longitudinal axis "Y". Internal cavity 464 is in fluid communication with the opening 446 located respectively in each of first enlarged member 428 and second enlarged member 430. The body portion 418 may further include an edge 466 defining a radially extending first opening 468 that is in fluid communication with the cavity 464. The edge 466 has a diameter that is sized to receive a pet treat 470 (FIG. 30) therethrough. The edge 466 may further be sized to receive a semi-solid treat, such as peanut butter, which is shown generally as a substance 472 inside the cavity 464. It will be understood that pet treats 470, 472 may alternatively be inserted through opening 446.

As depicted in FIG. 30, the body portion 418 may define a second opening 474 that is longitudinally offset from the first opening 468. Second opening 474 may also be radially offset from first opening 468. In one example, if first opening 468 extends radially upward, as illustrated in FIG. 4, then second opening 474 may be positioned radially downward at a location longitudinally offset from first opening 468. While the first and second openings 468, 474 may be oriented about 580° from each other, other degree offsets are entirely possible. For example, it is possible to have two openings in the body portion 418 that extend radially therethrough that are offset from each other at an angle less than 580° or greater than 580°. Additionally, as will be described in greater detail below, it is possible to have a plurality of openings extending radially through the sidewall of the body portion 418 that are longitudinally aligned.

Figure 27:
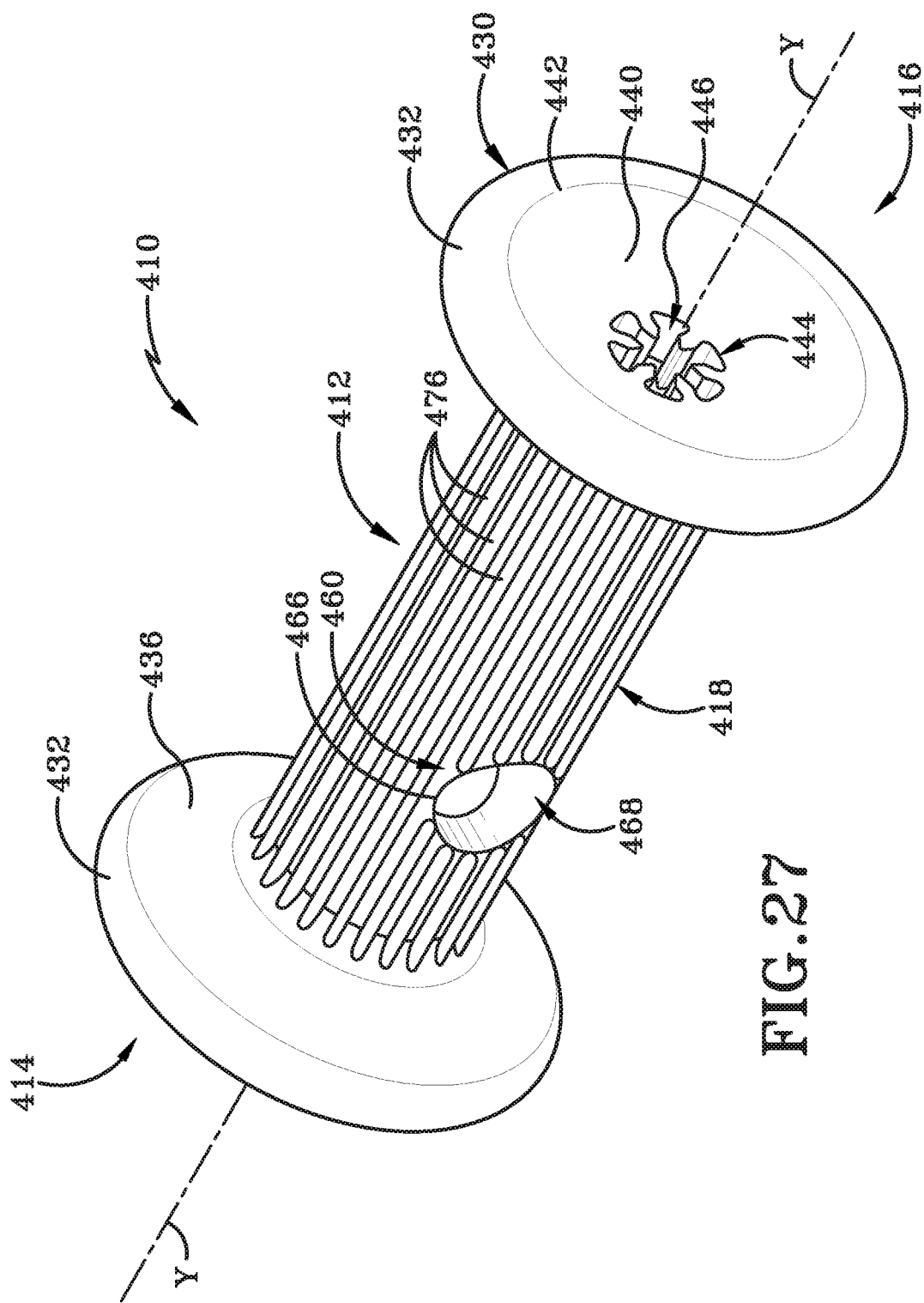
FIG. 27 is a perspective view of a fifth embodiment of a pet treat toy in accordance with the present disclosure.

The body portion 418 may further include a plurality of textured features or shapes that collectively define a portion of the outer surface 460 of body portion 418. The different shapes or texture portions of the body portion 418 establish different examples of a pet treat toy in accordance with the present disclosure. For example, FIGS. 27 and 28 illustrate that a plurality of longitudinally extending ribs 476 are provided at intervals on outer surface 460 of the body portion 418 and form a part thereof. Longitudinally extending ribs 476 may extend from first end 456 to second end 458 of body portion 418 and may be interrupted by the edges 466 defining first opening 468 and second opening 474. A valley may be defined between each pair of adjacent ribs 476 and these valleys may form spaces within which additional semi-solid treat material or substance 472 is able to be applied. Alternatively, the valleys between the ribs 476 may aid in cleaning the pet's teeth as the pet chews on toy 410. Alternatively, the outer surface 460 may be defined by any number or protrusions, bumps, contours, or the like to hold semi-solid treat material.

As a pet bites, chews, or otherwise manipulates toy 410, a treat 470 or some of the semi-solid treat substance 472 may exit from cavity 464 through one of opening 446. However, because of the shape of concave section 440, the semi-solid treat substance 472 in particular will be less likely to come into contact with floor surface "G" than would be the case if the side surface of the first or second enlarged member 428, 430 was flat or convex in shape instead of being concave. Instead, the semi-solid treat substance 472 may tend to coat portions of the concave section 440 surrounding opening 446 and the pet is likely to lick the substance 472 off of concave section 440.

FIGS. 31-40 show additional embodiments of the pet treat toy in accordance with the present disclosure. In each instance the body of the pet treat toy may be integrally formed as a unitary or unibody, monolithic member substantially fabricated from a flexible, manmade synthetic material. Furthermore, in one or more instances synthetic polymers may form a substantial majority of the components or elements used to fabricate the body of the pet treat toy and the other components integrally molded therewith. In some examples the pet treat toy may be formed from an elastomeric material or a rubber material configured to withstand deformation upon impact or chewing or mastication by the pet.

While it is contemplated that the body and the additional components of the pet treat toys described hereafter may be uniformly and integrally formed, it is entirely possible that the various components of the pet treat toy be formed separately from alternative materials as one having routine skill in the art would understand.

Additionally, the flexible and elastomeric or rubber components of the bodies of the pet treat toys described hereafter may enable certain portions of the bodies to flex or bend so as to permit ingress and egress of treats through various openings such that the treats inserted into an interior of the toy may be accessed as a reward when the pet has sufficiently maneuvered the treat into a position to remove the same from the toy. This will be further described later herein.

Figure 31:
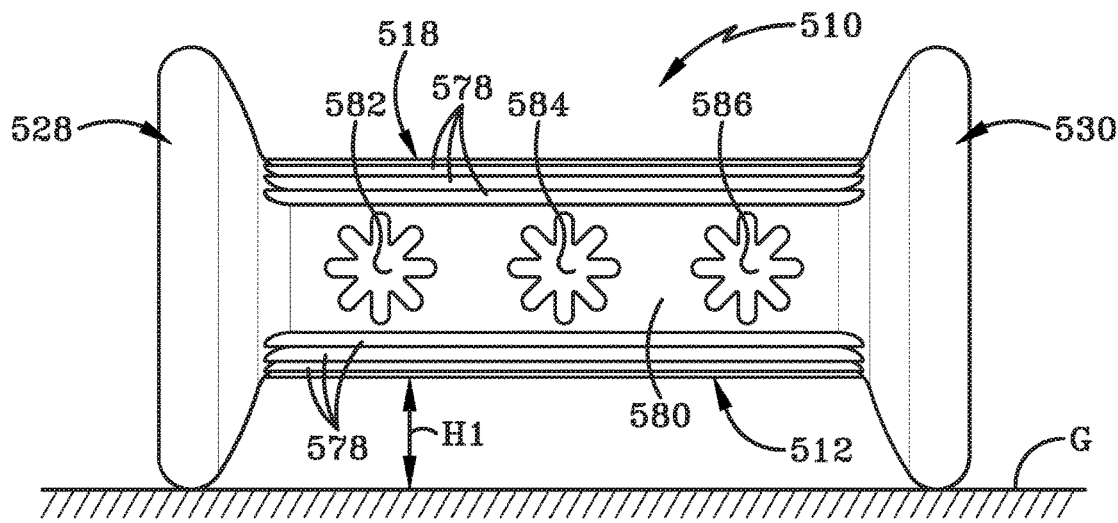
FIG. 31 is a side elevation view of a sixth embodiment of a pet treat toy in accordance with the present disclosure.

FIG. 31 depicts a sixth embodiment of the treat toy in accordance with the present disclosure, generally indicated at 510. Toy 510 has a body 512 that is substantially identical to toy 210 except for the configuration of body portion 518. Body portion 518 extends between first and second enlarged members 528, 530. First and second enlarged members 528, 530 are substantially identical to first and second enlarged members 28, 30. The body portion 518 may include longitudinally extending ribs 578 that are interrupted by a longitudinally extending smooth surface 580. The smooth surface 580 of the body portion 518 defines at least one opening 582 therein. More particularly, the smooth surface 580 of the body portion 518 also defines a second opening 584 and a third opening 586 therein. The first opening 582, second opening 584, and third opening 586 extend radially through the body portion 518 and into fluid communication with a cavity that is bounded and defined by the inner surface of the wall of body portion 518 and is similar to cavity 264. The openings 582, 584, 586 are shaped and sized in a manner so as to allow a hard treat or a semi-solid treat substance to pass therethrough and into the cavity In one example, the openings 582, 584 and 586 may be longitudinally aligned with each other. While FIG. 31 depicts that the first, second, and third openings 582, 584, and 586 are eight-pointed star-shaped openings, it will be understood that other geometrical configurations of the openings are entirely possible.

The body portion 518 may be elevated and raised above the floor surface "G" such that when the interior cavity of body portion 518 is filled with a substantially solid or hard pet treat or a semi-solid treat substance, the treats are elevated above the surface "G". When toy 510 rolls on surface "G", i.e., when first and second enlarged members 528, 530 roll on surface "G", no treat engages or touches the surface "G", thus leaving the surface "G" relatively clean.

Figure 32:
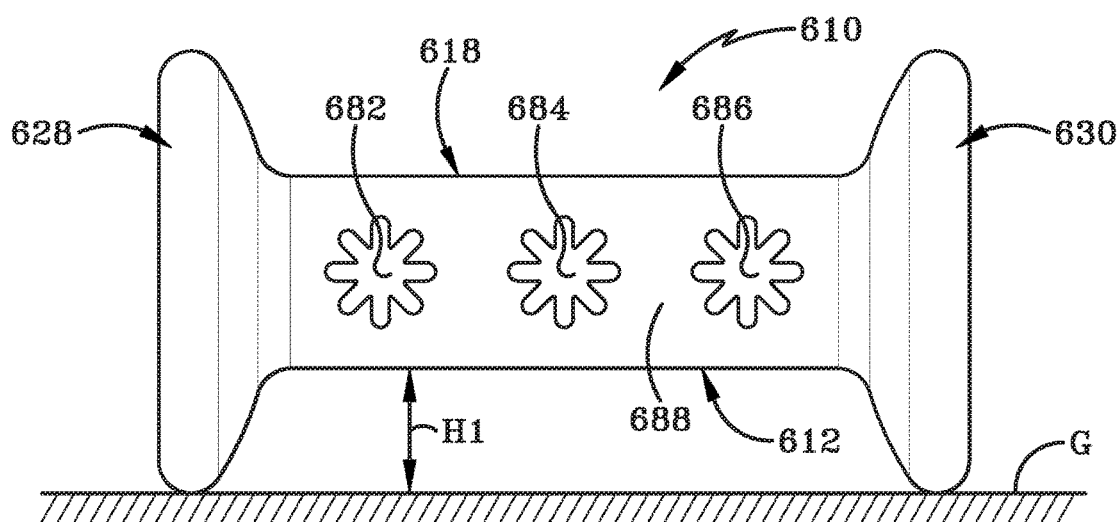
FIG. 32 is a side elevation view of a seventh embodiment of a pet treat toy in accordance with the present disclosure.

FIG. 32 depicts a seventh embodiment of a pet treat toy in accordance with an aspect of the present disclosure, generally indicated at 610. Pet treat toy 610 has a body 612 that is substantially identical to treat toy 610 except that treat toy 610 has a body portion 618 with an entirely smooth outer surface 688. In other words, the ribs 578 are omitted. The smooth outer surface 688 may define a first, second, and third opening, 682, 684, and 686 therein that are all in fluid communication with an interior cavity similar to cavity 264 of pet treat toy 210. The body portion 618 may be elevated above the floor surface "G" by a distance "H1" such that no portion of a hard pet treat or semi-solid treat substance will tend to contact the surface "G" as the pet tries to extract the hard treat or semi-solid treat substance. Body 612 further includes first and second enlarged members 628, 630 that are substantially identical to first and second enlarged members 28, 30.

Figure 33:
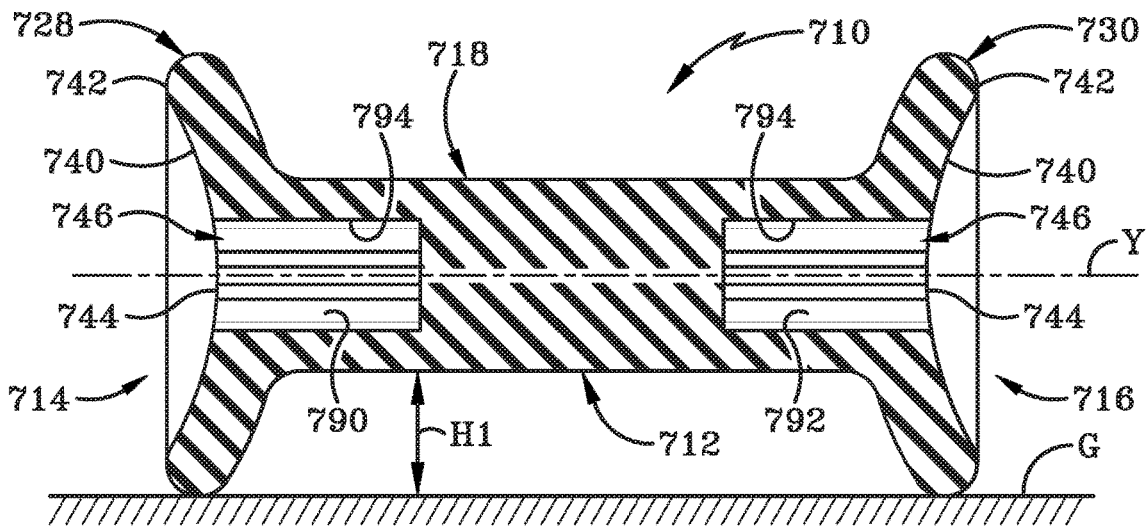
FIG. 33 is a longitudinal cross-section of a eighth embodiment of a pet treat toy of the present disclosure having an alternative body portion defining two end cavities that can be elevated from a floor surface in the event the pet treat toy is turned on its end.

FIG. 33 depicts an eighth embodiment of a pet treat toy in accordance with the present disclosure, generally indicated at 710. Pet treat toy 710 includes a body 712 having a body portion 718 and first and second enlarged members 728, 730. (First and second enlarged members 728, 730 may be substantially identical in structure and function to first and second enlarged members 28, 30.) Body portion 718 may be substantially solid and defines a first cavity 790 and a second cavity 792. The first and second cavities 790, 792 are centered along the longitudinal axis "Y" and are separated from each other by a solid region of body portion 718. First and second cavities 790, 792 are in fluid communication with the openings 746, respectively defined by the first enlarged member 728 and the second enlarged member 730. The first and second cavities 790, 792 may each act as a separate treat receptacle. More particularly, the first and second cavities 790, 792 may be sized to receive a hard treat or a semi-solid treat substance therein. In each instance that the cavities 790, 792 receive a treat therein, the treat is maintained at a height "H1" elevated from the surface "G" by first and second enlarged members 728, 730 so as to keep the treat off the floor and keep the surface "G" in a clean state when treat toy 710 is in use by a pet.

The first and second cavities 790, 792 may have a smooth inner surface 794 or alternatively, the inner surface 794 of the cavities 790, 792 may mirror the shape of the opening 746 formed in the first and second enlarged members 728, 730. The first and second cavities 790, 792 may remain elevated from the floor surface "G" in the event that the toy 710 is turned either on its first end 714 or its second end 716. Particularly, the concave surface 740 extending upwardly and inwardly from the outer edge 742 enables the edge 744 defining opening 746 to the cavities 790, 792 to be recessed relative to edge 742 and therefore never come into contact with floor surface "G". Thus, similar to openings 582, 584, and 586, no portion of the edges of the openings 744 to the interior cavities 790, 792 of the toy 710 contact the floor surface when treat toy 710 is manipulated by a pet.

Figure 34:
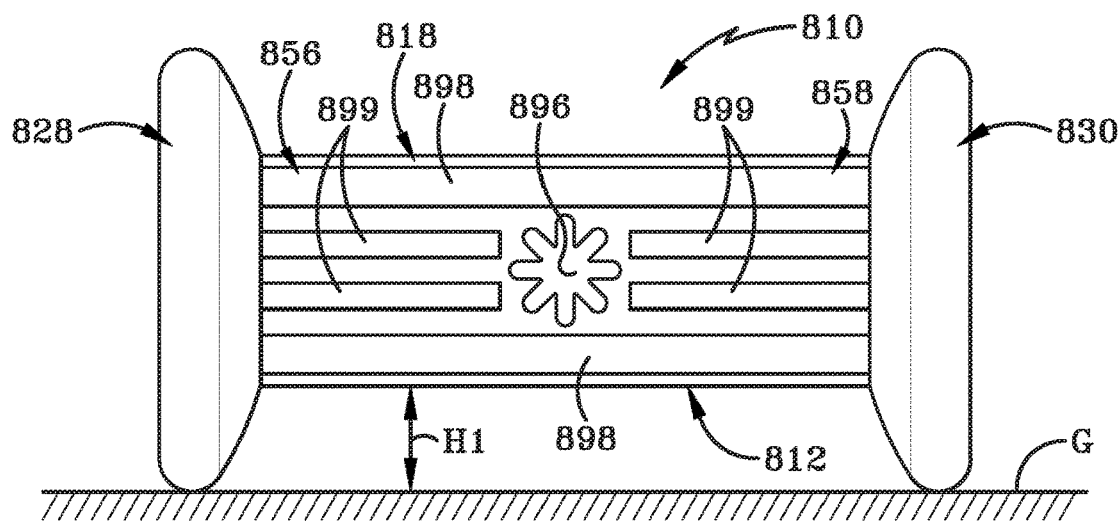
FIG. 34 is a side elevation view of a ninth embodiment of a pet treat toy of the present disclosure.

FIG. 34 depicts a ninth embodiment of a pet treat toy in accordance with the present disclosure, generally indicated at 810. Treat toy 810 has a body portion 818 extending between the first and second enlarged members 828, 830. (First and second enlarged members 828, 830 may be substantially identical in structure and function to first and second enlarged members 28, 30.) Body portion 818 may define a single opening 896 that may be located generally centrally along the length of body portion 818 and is in fluid communication with an interior cavity similar to cavity 264 of toy 210. The opening 896 may have a star-shaped pattern similar to other openings previously described herein. However, it is entirely understood that the opening 896 may have a different geometric configuration. The opening 896 within body portion 818 is in fluid communication with the interior cavity of the body portion 818 and may be configured to receive a hard treat or a semi-solid treat substance therethrough. In each instance, the opening 896 is configured to allow the treat to pass therethrough and the positioning of the body portion 818 above the floor surface "G" by a distance "H1" enables the surface "G" to remain in a clean state since the treat is elevated and should not contact the surface "G".

The wall of body portion 818 further may include longitudinal ribs of varying sizes. More particularly, one or more first longitudinal ribs 898 may be provided that have a greater width than one or more second longitudinal ribs 899. The larger or wider first ribs 898 extend fully along the length of the body portion 818 from the first end 856 to the second end 858. The smaller or narrower ribs 899 may be interrupted by the opening 896 such that they do not fully extend between the first end 856 and the second end 858 of body portion 818. The first and second ribs 898, 899 may be spaced circumferentially apart so as to define valleys or spaces therebetween. A quantity of semi-solid treat substance such as semi-solid substance may be applied in these valleys if desired. Alternatively, the alternating ribs 898, 899 and valleys may be left empty and may serve the purpose of helping to clean the pet's teeth as the pet chews or plays with the toy 810.

Figure 35:
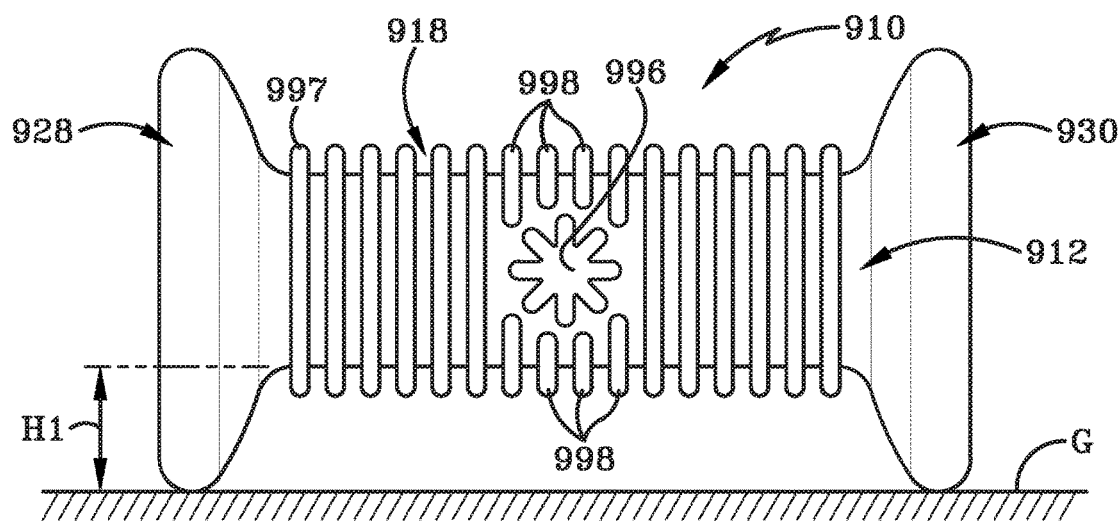
FIG. 35 is a side elevation view of a tenth embodiment of a pet treat toy of the present disclosure.

FIG. 35 illustrates a tenth embodiment of a pet treat toy in accordance with the present disclosure, generally indicated at 910. Pet treat toy 910 has a body 912 that may have a body portion 918 defining a single opening 996 therein that is in fluid communication with an interior cavity. Body portion 918 may include a plurality of radially extending ribs 997 that extend around the circumference of the outer surface of body portion 918. The body portion 918 may further include ribs 998 that extend only partially around the circumference of the outer surface of body portion 918. The partial ribs 998 may be interrupted by the opening 996 extending radially through the sidewall of the body portion 918. Opening 996 may be in fluid communication with an interior cavity that is configured to receive treats therein and maintain the treats in an elevated position from a surface "G". In particular, first and second enlarged members 928, 930 retain body portion 918 a distance "H1" from the floor surface "G" and body portion 918 therefore does not contact the floor surface "G". Ribs 997 and 998 may be substantially parallel to each other and oriented at right angles to longitudinal axis of the body portion 918. Furthermore, a valley may be defined between adjacent ribs 997, 998. First and second enlarged members 928, 930 may be substantially identical in structure and function to first and second enlarged members 28, 30.

Figure 36:
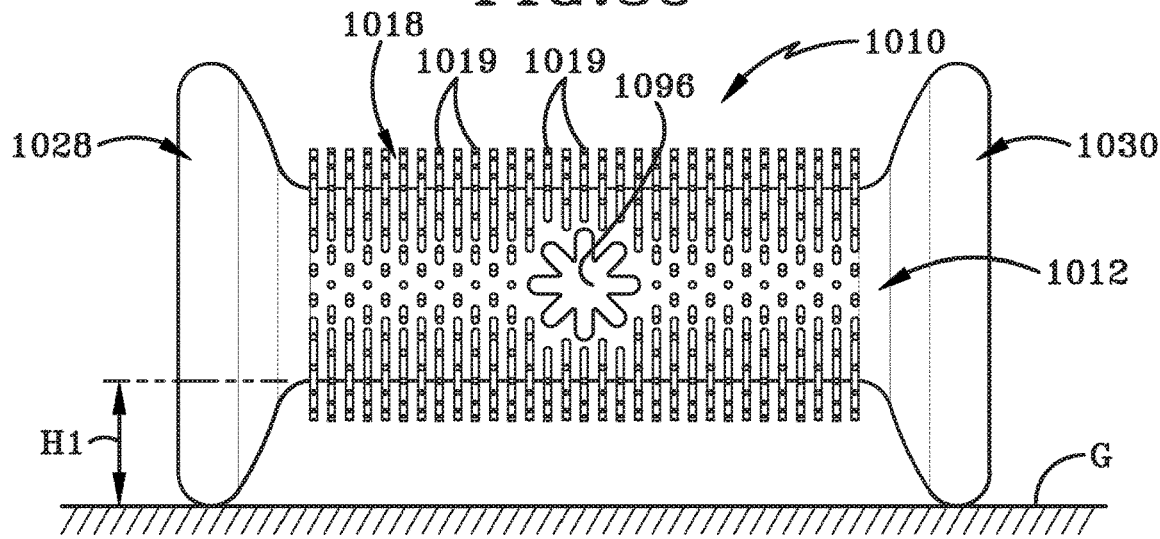
FIG. 36 is a side elevation view of an eleventh embodiment of a pet treat toy of the present disclosure.

FIG. 36 shows an eleventh embodiment of a pet treat toy in accordance with the present disclosure, generally indicated at 1010. Pet treat toy 1010 has a body 1012 that may have a body portion 1018 having a plurality of spiked teeth 1019 extending radially outwardly from the outer surface of the wall of body portion 1018. The teeth 1019 may be arranged in rows that extend circumferentially around the outer surface of the wall of body portion 1018. The rows may be oriented substantially at right angles to a longitudinal axis of the body portion 1018. The rows may be spaced a distance apart from each other. Teeth 1019 may be shaped similar to the teeth of a comb or a brush and be separated from each other by narrow gaps. Some of the rows of teeth 1019 may be interrupted by a single opening 1096 that is defined in the body portion 1018 and which is in fluid communication with an internal cavity. The internal cavity may be similar to cavity 264 and may be configured to receive treats therein and maintain them in an elevated position above the floor surface "G". Body 1012 may further include first and second enlarged members 1028, 1030 that may be similar in structure and function to first and second enlarged members 28, 30.

Figure 37:
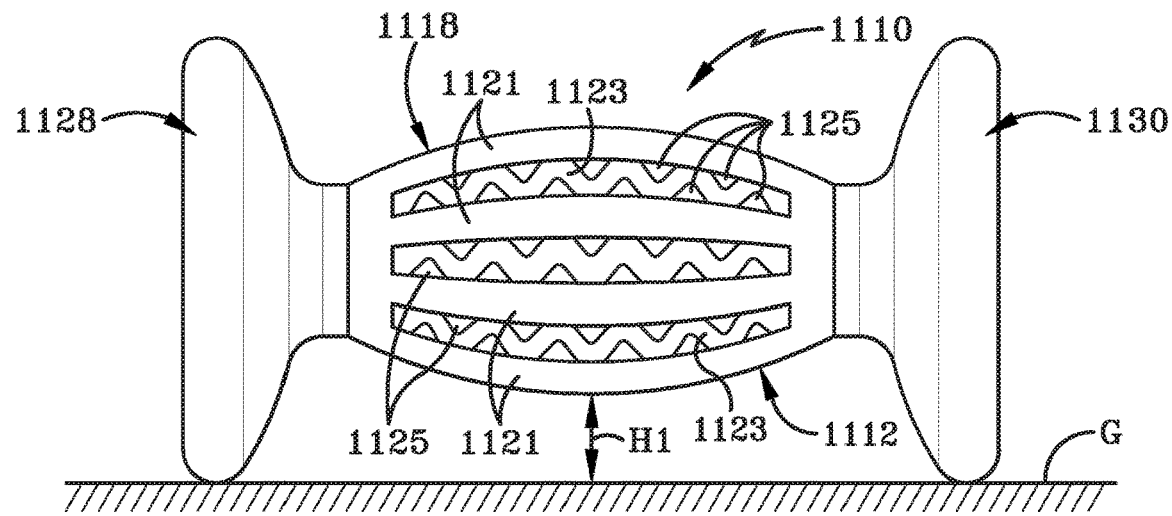
FIG. 37 is a side elevation view of a twelfth embodiment of a pet treat toy of the present disclosure.

FIG. 37 depicts a twelfth embodiment of a pet treat toy in accordance with the present disclosure, generally indicated at 1110. Pet treat toy 1110 includes a body 1112 having a body portion 1118 extending between a first enlarged member 1128 and a second enlarged member 1130. First and second enlarged members 1128, 1130 that may be similar to first and second enlarged members 28, 30 in structure and function. Body portion 1118 may include a plurality of longitudinally bowed ribs 1121 defining spaces 1123 therebetween. A plurality of teeth 1125 may extend outwardly from the bowed ribs 1121 and into spaces 1123. The spaces 1123 may be formed into a zigzag pattern based on the manner in which alternating teeth 1125 extend from the bowed ribs 1121. The spaces 1123 may be in fluid communication with an interior cavity defined by body portion 1118. The interior cavity, which may be similar to cavity 264, is configured to receive hardened treats or a semi-solid treat substance therein. Body portion 1118 maintains the treats elevated above the surface "G" when the first and second enlarged members 1128, 1130 are both contacting the floor surface "G".

Figure 38:
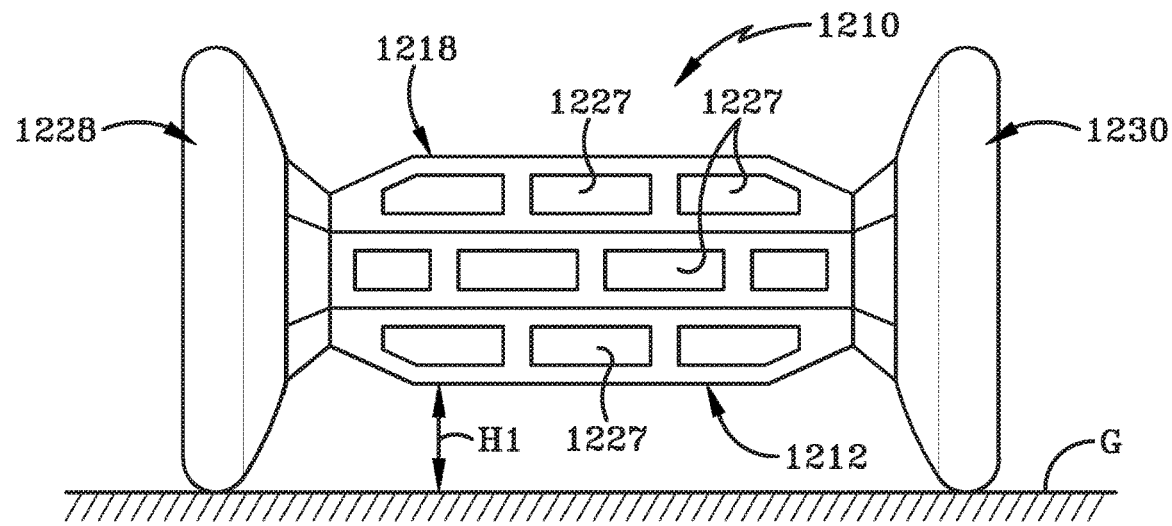
FIG. 38 is a side elevation view of a thirteenth embodiment of a pet treat toy of the present disclosure.

FIG. 38 depicts a thirteenth embodiment of a pet treat toy in accordance with the present disclosure, generally indicated at 1210. Treat toy 1210 includes a body 1212 with first and second enlarged members 1228, 1230 and a body portion 1218 extending therebetween. First and second enlarged members 1228, 1230 are substantially identical in structure and function to first and second enlarged members 28, 30. Body portion 1218 may have a waffle design or configuration. The waffle design may include a plurality of spaces 1227 that are in fluid communication with an internal cavity configured to receive and hold a treat therein. Body portion 1218 is located a distance "H1" above the floor surface "G" when both first and second enlarged members 1228, 1230 contact floor surface "G" and thereby help keep treats, particularly semi-solid treat substances off floor surface "G".

Figure 39:
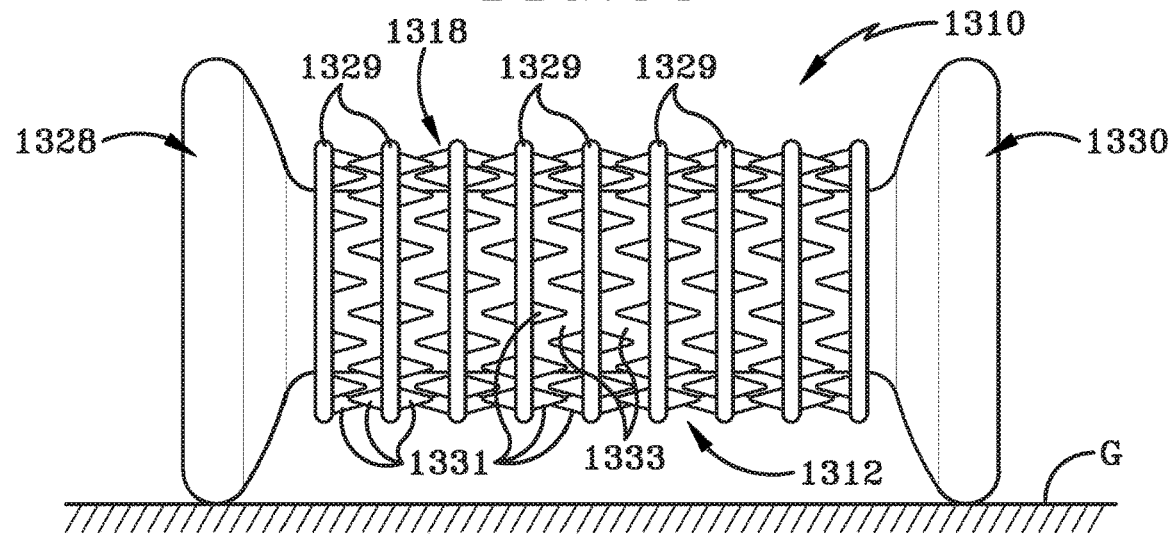
FIG. 39 is a side elevation view of a fourteenth embodiment of a pet treat toy of the present disclosure.

FIG. 39 illustrates a fourteenth embodiment of a pet treat toy in accordance with the present disclosure, generally indicated at 1310. Treat toy 1310 includes first and second enlarged members 1328, 1330 and a body portion 1318 that extends therebetween. As with previous embodiments, first and second enlarged members 1328, 1330 may be substantially identical in structure and function to first and second enlarged members 28, 30. Body portion 1318 may include a wall comprising a plurality of spaced apart, circumferentially arranged ribs 1329 and a plurality of V-shaped teeth 1331 extending longitudinally from the circumferentially arranged ribs 1329. The teeth 1331 may be raised relative to an outer surface of body portion 1318. The pet treat toy 1310 may include a longitudinally extending bore or hole running the length of the toy 1310 and the bore or hole may be of a reduced inner surface diameter based on the depths of the ridges established between the teeth 1331 and the ribs 1329. Spaces 1333 defined between teeth 1331 may be in fluid communication with the bore or hole and may be sized to receive hardened treats or semi-solid treat substances therein.

Figure 40:
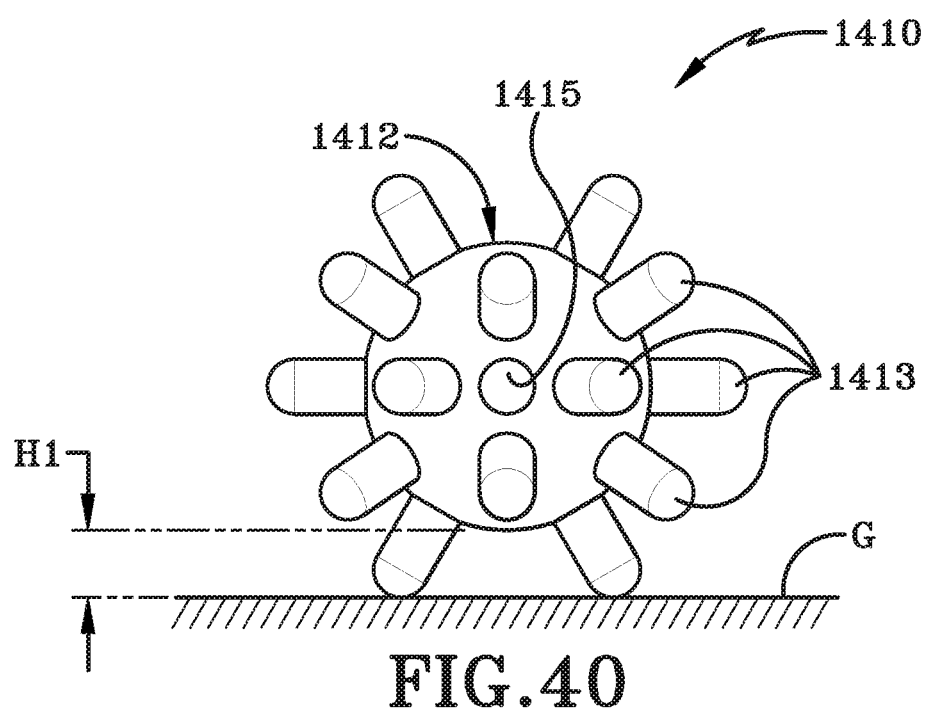
FIG. 40 is a side elevation view of a fifteenth embodiment of a pet treat toy of the present disclosure.

FIG. 40 provides a fifteenth embodiment of a pet treat toy in accordance with the present disclosure and is generally indicated at 1410. Toy 1410 may comprise a generally spherically-shaped body 1412 having a plurality of elongated members 1413 extending radially outwardly therefrom. The spherical body 1412 may define an aperture 1415 therein which is in fluid communication with an interior cavity. The aperture 1415 may be configured to receive hard pet treat or semi-solid treat substance therethrough. The elongated members 1413 may be sized in such a manner so as to elevate the spherical body 1412 a distance "H1" above the floor surface "G" such that the treat contained within the interior cavity of the spherical body 1412 and the edge defining the aperture 1415 do not contact the floor surface "G" when the pet treat toy 1410 has at least two elongated members 1413 contacting the floor surface "G". In one example, the clearance distance "H1" is in a range of from about one-half inch up to about one inch.

It will be understood that in any of the aforementioned embodiments, instead of having openings defined in the enlarged first and second enlarged members, the portion of the treat toy that defines the interior cavity may define an opening into that interior cavity. So, for example, in treat toy 10, one or both of the openings 46, 47 may be omitted and an opening similar to opening 68 may be defined in the wall of body portion 18. The opening defined in the wall may be of any shape, such as generally circular in shape. Furthermore, instead of having two enlarged members such as first enlarged member 28 and second enlarged member 30, any of the aforementioned embodiments may have only one enlarged member, such as first enlarged member 28. Alternatively, one of the enlarged members, such as first enlarged member 28 may be replaced with any other member that will retain part of body portion 18 away from a surface "G" upon which the pet treat toy rests. So, for example, first enlarged member 28 may be replaced by one or more elongated members similar to member 1413 (FIG. 40).

It should also be understood that any of the various embodiments of pet treat toy disclosed herein may be fabricated from the same materials and in the same manner as the first embodiment of pet treat toy.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A pet treat toy comprising:
   a body portion defining a cavity therein;
   at least one enlarged member extending outwardly from the body portion; and
   an opening defined in one of the body portion and the at least one enlarged member; wherein said opening is in fluid communication with the cavity; and wherein a region of the at least one enlarged member is adapted to retain the opening a distance away from a surface upon which the pet treat toy rests;
   wherein the at least one enlarged member comprises a first enlarged member and a second enlarged member; and wherein the body portion is located between the first enlarged member and the second enlarged member; and wherein a longitudinal axis extends between the first enlarged member and the second enlarged member; and wherein the body portion is generally spherical in shape.

2. The pet treat toy according to claim 1, wherein the body portion includes a wall that is generally spherical and has an outer surface that includes a plurality of projections extending outwardly therefrom.

3. The pet treat toy according to claim 1, wherein the body portion includes a wall that is generally spherical and has an outer surface that is substantially smooth.

4. The pet treat toy according to claim 3, wherein the body portion has a wall having at least one ridge thereon.

5. The pet treat toy according to claim 4, wherein the at least one ridge is oriented at right angles to the longitudinal axis.

6. The pet treat toy according to claim 5, where the at least one ridge includes a first ridge and a second ridge; and wherein a trough is located between the first ridge and the second ridge.

7. The pet treat toy according to claim 6, wherein the wall further comprises a plurality of fingers that extend into the trough.

8. The pet treat toy according to claim 7, wherein the plurality of fingers extends outwardly from a side surface of one of the first ridge and the second ridge and towards a side surface of the other of the first ridge and the second ridge.

9. The pet treat toy according to claim 8, wherein the plurality of fingers includes a first plurality of fingers that extend outwardly from the side surface of the first ridge; and a second plurality of fingers that extend outwardly from the side surface of the second ridge; and wherein the first plurality of fingers and the second plurality of fingers are interleaved with each other.

10. The pet treat toy according to claim 6, wherein the wall further comprises a plurality of fingers extending upwardly from a portion of the wall that defines a bottom region of the trough.

11. The pet treat toy according to claim 1, wherein the at least one enlarged member has a circumferential edge adapted to contact the surface upon which the pet treat toy rests; and the circumferential edge has a maximum first diameter; and the body portion is of a second diameter; and the second diameter is smaller than the first diameter.

12. A pet treat toy comprising:
    a body portion defining a cavity therein;
    at least one enlarged member extending outwardly from the body portion; and
    an opening defined in one of the body portion and the at least one enlarged member; wherein said opening is in fluid communication with the cavity; and wherein a region of the at least one enlarged member is adapted to retain the opening a distance away from a surface upon which the pet treat toy rests;
    wherein the at least one enlarged member defines a concave surface that terminates in an outermost edge that is adapted to contact the surface upon which the pet treat toy rests; and wherein the opening is defined in the concave surface and is recessed relative to the outermost edge.

13. The pet treat toy according to claim 12, wherein the body portion is generally spherical in shape.

14. The pet treat toy according to claim 12, wherein the at least one enlarged member has a circumferential edge adapted to contact the surface upon which the pet treat toy rests; and the circumferential edge has a maximum first diameter; and the body portion is of a second diameter; and the second diameter is smaller than the first diameter.

15. The pet treat toy according to claim 12, wherein the body portion has an exterior wall having at least one ridge thereon; and wherein the at least one enlarged member has an exterior wall that is substantially smooth.

16. A pet treat toy comprising:
a body portion defining a cavity therein;
at least one enlarged member extending outwardly from the body portion; and
an opening defined in one of the body portion and the at least one enlarged member; wherein said opening is in fluid communication with the cavity; and wherein a region of the at least one enlarged member is adapted to retain the opening a distance away from a surface upon which the pet treat toy rests;
wherein the at least one enlarged member includes a first enlarged member and a second enlarged member; and the body portion extends between the first enlarged member and the second enlarged member; and wherein each of the first enlarged member and second enlarged member has a concave surface that terminates in an outermost edge; and wherein the opening is defined in the concave surface of the first enlarged member and a second opening is defined in the concave surface of the second enlarged member; and the second opening is in fluid communication with the interior cavity.

17. The pet treat toy according to claim 16, further comprising an additional opening defined in the body portion, wherein the additional opening is in fluid communication with the interior cavity.

18. A method of providing a treat to a pet comprising:
providing a pet treat toy comprising a generally spherical body portion interposed between a first enlarged member and a second enlarged member; wherein the body portion defines a cavity therein and an opening to the cavity is defined in one of the body portion, the first enlarged member and the second enlarged member;
inserting a pet treat through the opening and into the cavity;
recessing the opening a distance inwardly from an edge of the body portion, the first enlarged member or the second enlarged member in which the opening is defined;
placing the edge in contact with a surface upon which the pet toy rests; and
keeping the pet treat a distance off the surface that is substantially equal to the distance that the opening is recessed inwardly from the edge.

19. The method according to claim 18, wherein the inserting of the pet treat comprises inserting a first pet treat into the opening, where the first pet treat is a solid pet treat having a central region and one or more arms extending outwardly from the central region.

20. The method according to claim 19, further comprising:
inserting a second pet treat through the opening; where the second pet treat is substantially similar to the first pet treat; and
interlocking at least some of the one or more arms of the first pet treat with at least some of the one or more arms of the second pet treat; and
delaying removal of one of the first pet treat and the second pet treat from the interior cavity.

21. The method according to claim 20, further comprising:
progressively increasing a challenge to a pet to remove one of the first pet treat and the second pet treat by introducing at least a third pet treat through the opening;
wherein the at least the third pet treat is substantially similar to the first pet treat; and
the challenge is increased by interlocking at least some of the one or more arms of the third pet treat with at least some of the one or more arms of one or both of the first pet treat and the second pet treat.

22. The method according to claim 18, wherein the inserting of the pet treat includes placing a quantity of a semi-solid pet treat substance into the opening; and the method further comprises keeping the quantity of semi-solid pet treat substance away from contacting the surface upon which the pet treat toy rests by maintaining a portion of the first enlarged member or the second enlarged member between the opening and the surface upon which the pet treat toy rests.

* * * * *